US008081255B2

(12) United States Patent
Koshimizu et al.

(10) Patent No.: US 8,081,255 B2
(45) Date of Patent: Dec. 20, 2011

(54) IMAGE CONVERTING APPARATUS, IMAGE SIGNAL PROCESSING APPARATUS, CAMERA SYSTEM AND IMAGE SIGNAL PROCESSING METHOD

(75) Inventors: Mikio Koshimizu, Kanagawa (JP); Yasushi Sato, Kanagawa (JP); Takeo Tsumura, Tokyo (JP); Yosihiro Minami, Tokyo (JP)

(73) Assignee: Sony Corporation, Tokyo (JP)

( * ) Notice: Subject to any disclaimer, the term of this patent is extended or adjusted under 35 U.S.C. 154(b) by 1420 days.

(21) Appl. No.: 11/543,915

(22) Filed: Oct. 6, 2006

(65) Prior Publication Data

US 2007/0091204 A1  Apr. 26, 2007

(30) Foreign Application Priority Data

Oct. 20, 2005 (JP) ................ P2005-305538

(51) Int. Cl.
*H04N 7/01* (2006.01)
(52) U.S. Cl. ......................................... 348/441
(58) Field of Classification Search .................. 348/441, 348/443, 445, 448, 449, 459, 452, 439.1; 386/110, 129, 131, 5
See application file for complete search history.

(56) References Cited

U.S. PATENT DOCUMENTS

| | | | |
|---|---|---|---|
| 6,215,516 B1* | 4/2001 | Ma et al. | 348/43 |
| 6,727,958 B1* | 4/2004 | Shyu | 348/581 |
| 6,850,564 B1* | 2/2005 | Pejhan et al. | 375/240.02 |
| 7,158,186 B2* | 1/2007 | Selby et al. | 348/459 |
| 7,242,850 B2* | 7/2007 | Cok | 386/241 |
| 7,420,618 B2* | 9/2008 | Swartz | 348/554 |
| 7,557,833 B2* | 7/2009 | Okawa | 348/220.1 |
| 7,586,540 B2* | 9/2009 | Ogino et al. | 348/448 |
| 7,602,440 B2* | 10/2009 | Nishi et al. | 348/441 |
| 2003/0219160 A1* | 11/2003 | Song et al. | 382/236 |
| 2004/0183945 A1* | 9/2004 | Ochiai et al. | 348/441 |
| 2005/0001929 A1* | 1/2005 | Ochial et al. | 348/448 |
| 2007/0067480 A1* | 3/2007 | Beek et al. | 709/231 |
| 2007/0127572 A1 | 6/2007 | Sasai et al. | |
| 2008/0007614 A1* | 1/2008 | Mizuhashi et al. | 348/14.01 |

FOREIGN PATENT DOCUMENTS

| | | |
|---|---|---|
| JP | 06-133297 A | 5/1994 |
| JP | 06-169419 A | 6/1994 |
| JP | 10-285588 A | 10/1998 |
| JP | 10-304334 A | 11/1998 |
| JP | 11-112940 A | 4/1999 |
| JP | 2002-271671 A | 9/2002 |
| JP | 2002-320203 | 10/2002 |
| JP | 2003-153177 A | 5/2003 |
| JP | 2003-262788 A | 9/2003 |

(Continued)

OTHER PUBLICATIONS

Japanese Office Action issued Jul. 6, 2010 for corresponding Japanese Application No. 2005-305538.

(Continued)

*Primary Examiner* — Paulos Natnael
(74) *Attorney, Agent, or Firm* — Rader Fishman & Grauer PLLC

(57) ABSTRACT

An image converting apparatus includes a memory which can store frame information of an image to be played, and an image processing section which can read frame information from the memory and convert the frame rate to a predetermined frame rate in response to a predetermined state and in accordance with the play state.

1 Claim, 24 Drawing Sheets

FOREIGN PATENT DOCUMENTS

| | | |
|---|---|---|
| JP | 2004-088244 A | 3/2004 |
| JP | 2004-221999 | 8/2004 |
| JP | 2005-027337 | 1/2005 |
| WO | WO-2005/076630 A1 | 8/2005 |

OTHER PUBLICATIONS

Japanese Office Action issued Mar. 15, 2011 for corresponding Japanese Application No. 2005-305538.

* cited by examiner

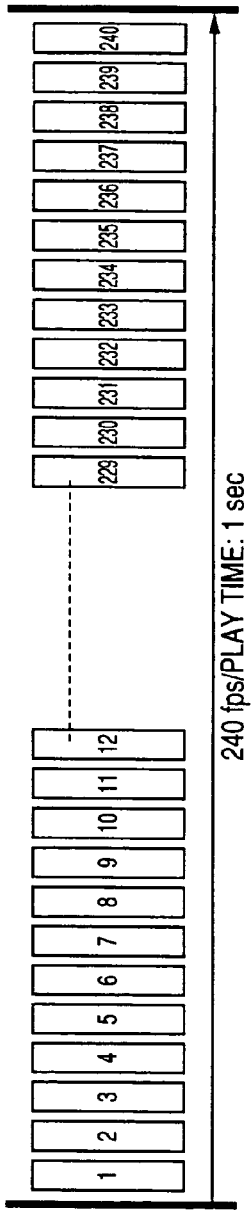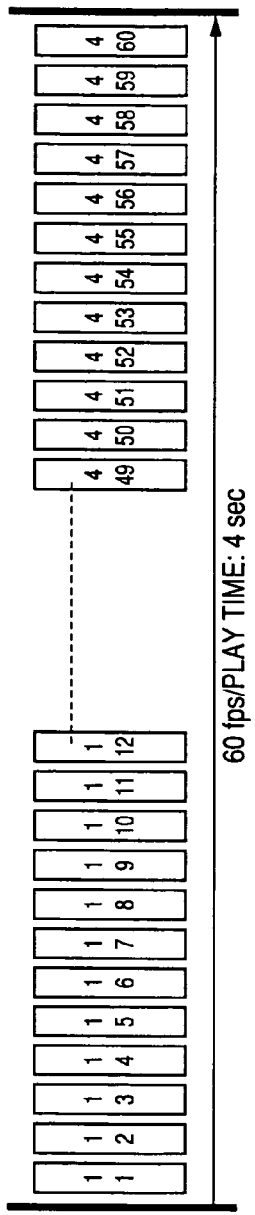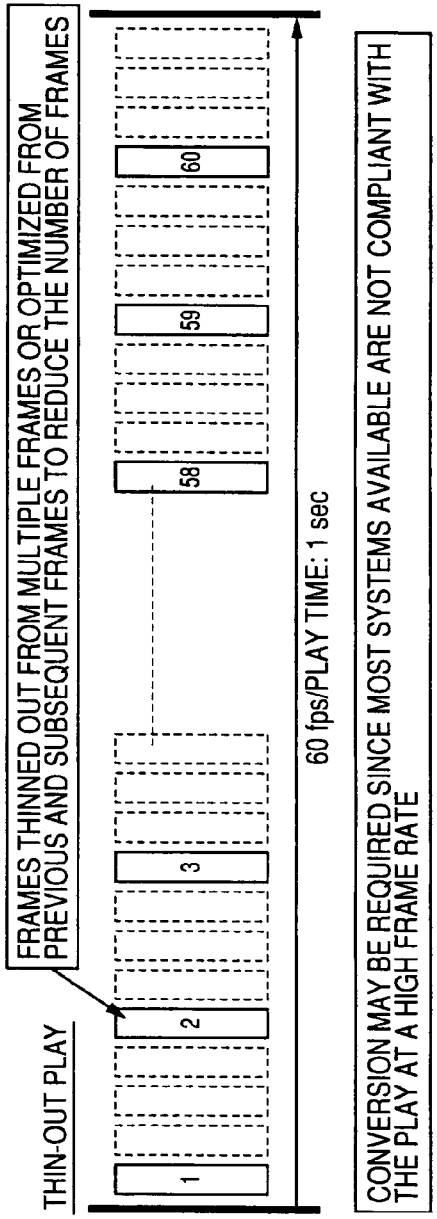

IN FRAME RATE CONVERSION

IN NORMAL SCALING

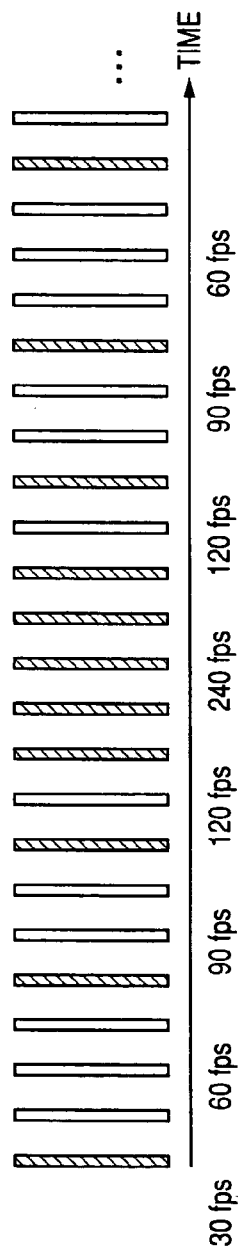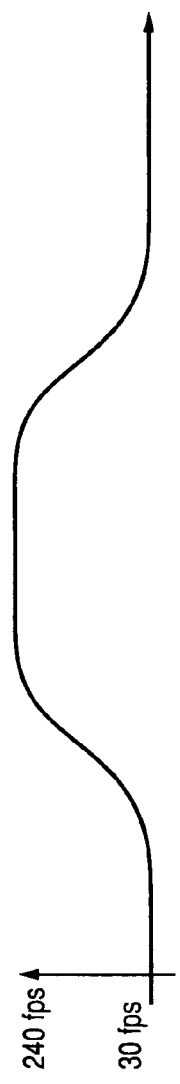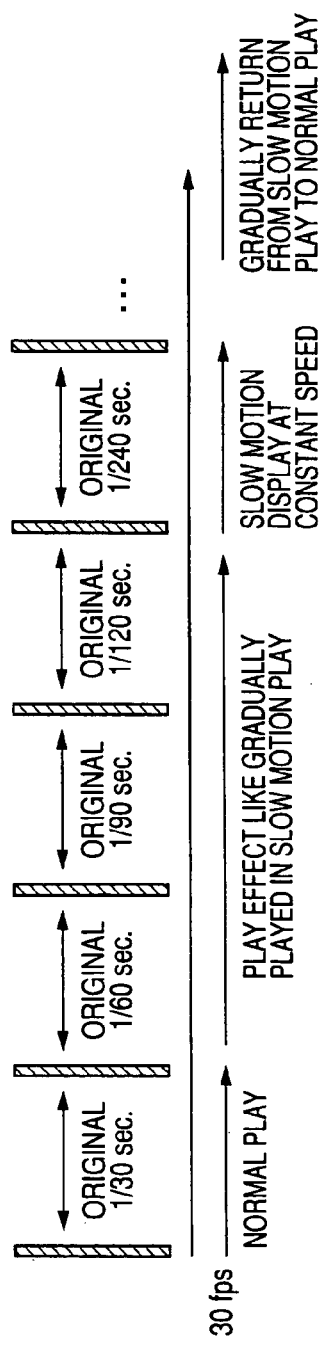
FIG. 17A ■ IN SHOOTING
FIG. 17B ■ IMAGE OF RATE TRANSITION
FIG. 17C ■ IN PLAY

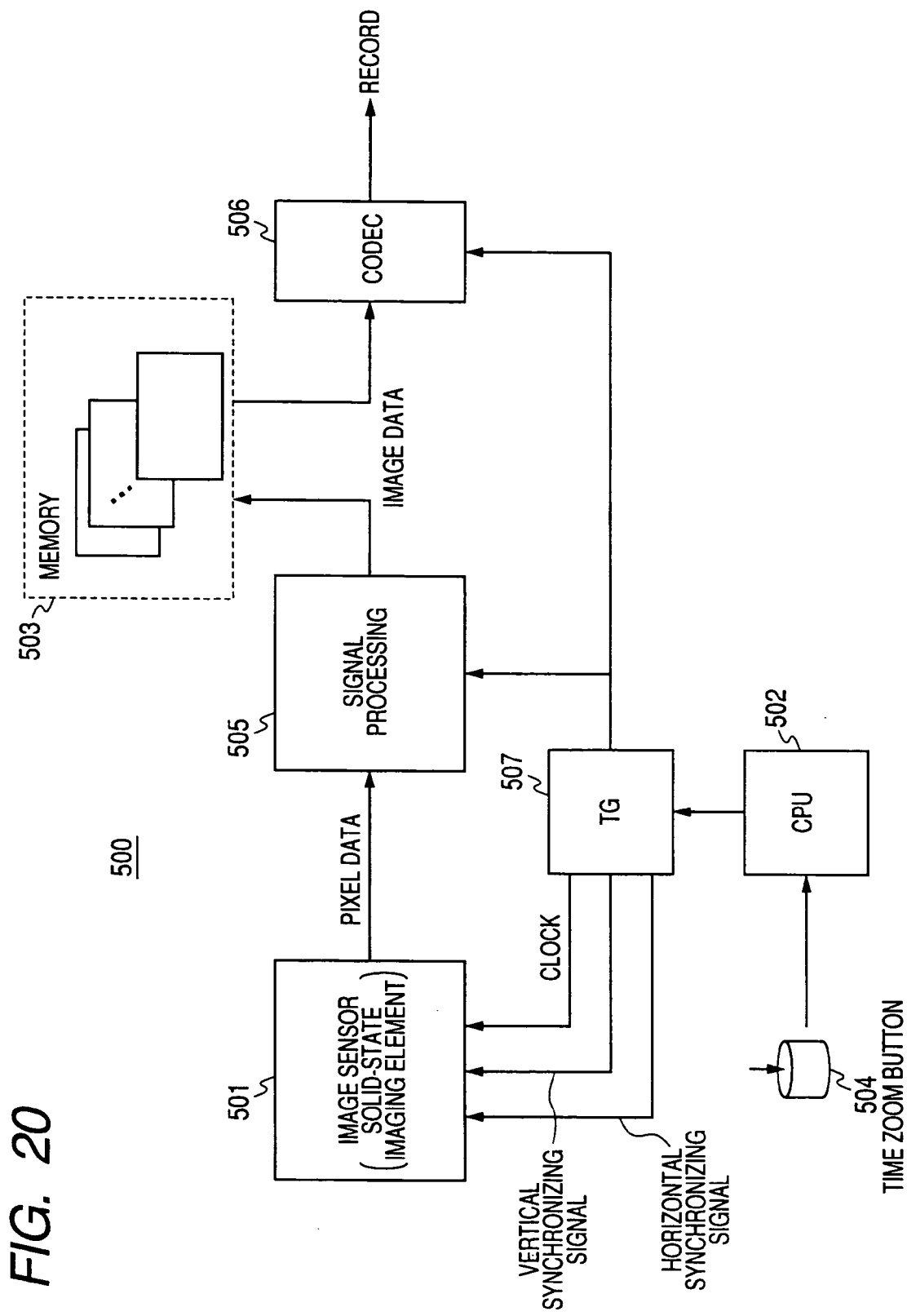

IMAGE CONVERTING APPARATUS, IMAGE SIGNAL PROCESSING APPARATUS, CAMERA SYSTEM AND IMAGE SIGNAL PROCESSING METHOD

CROSS REFERENCES TO RELATED APPLICATIONS

The present invention contains subject matter related to Japanese Patent Application JP2005-305538 filed in the Japanese Patent Office on Oct. 20, 2005, the entire contents of which being incorporated herein by reference.

BACKGROUND OF THE INVENTION

1. Field of the Invention

The present invention relates to an image converting apparatus, image signal processing apparatus, camera system and image signal processing method, which may allow the conversion of the frame rate and/or resolution of a moving or still image, for example.

2. Description of the Related Art

The progress of the semiconductor technologies and display device technologies has increased the amount of high quality still or moving pictures which can be handled at higher resolutions and higher frame rates.

However, even the pictures created in that manner may not be played by all display apparatus such as a display and a television.

Accordingly, JP-A-2004-221999 (Patent Document 1), for example, proposes "an image processing method", which allows "the play at a second frame rate lower than the frame rate in shooting".

Also, JP-A-2002-320203 (Patent Document 2) proposes "a video signal recording apparatus and video signal playing apparatus", which allows "automatically performing the adjustment of the speed of the play and the rate conversion on video signals".

The time and amount of information of moving pictures have been increased. Therefore, it takes time for a user to check the moving pictures after they are created.

Accordingly, JP-A-2005-27337 (Patent Document 3) proposes "a multi-display method and apparatus", which allows the "simultaneous display" of selected "multiple angles and multiple scenes" during "a same time period".

By the way, a general fast-shootable image recording apparatus, video camera or digital camera system has an image sensor and image processing section allowing the shooting over a frame rate of 15 fps to 60 fps, which is a time resolution enough for the sense of sight of human beings.

These apparatus allow the shooting at a higher frame rate such as 120 fps and 240 fps, which is permitted by the capacity and transfer speed of a storage area included in the apparatus.

Furthermore, in order to change a frame rate, the frame rate may be generally required to define before shooting.

SUMMARY OF THE INVENTION

However, in the "image processing method" disclosed in Patent Document 1, the displayable "second frame rate" may be required to define for each display apparatus though "the play at a second frame rate lower than the frame rate in shooting" is allowed.

The "video signal recording apparatus and video signal reproducing apparatus" disclosed in Patent Document 2 includes one "player" only and may output only one "reproduced video signal" at a time though "automatically performing the adjustment of the speed of the reproduction and the rate conversion on video signals" is allowed.

The "multi-display method and apparatus" disclosed in Patent Document 3 may not display pictures during different time periods or may not display a same scene simultaneously by different play methods though the "simultaneous display" of selected "multiple angles and multiple scenes" during "a same time period" is allowed.

Furthermore, handling high quality images disadvantageously increases the frequencies and power consumption of circuits and apparatus and the used amount of a memory therefor.

The general fast-shootable image recording apparatus, video camera or digital camera system particularly lacks a device for naturally providing a viewer with data shot at high frame rate continuously from the data shot at a normal speed when the high frame rate shot data is displayed later to view since only the high frame rate data part is independent and is generally independently played though these apparatus allow the shooting at a higher frame rate such as 120 fps and 240 fps, which is permitted by the capacity and transfer speed of a storage area included in the apparatus.

Furthermore, in the frame rate changing method, which may require the definition of a frame rate before shooting, a user may not change a frame rate anytime since the frame rate setting may not be changed during shooting.

Therefore, shooting with a higher frame rate setting results in an increase in amount of image data, which may require a memory with a large capacity.

Accordingly, it is desirable to propose a converting apparatus, image signal processing apparatus, camera system and image signal processing method, which can provide an optimum frame rate and resolution in accordance with a given display apparatus and/or internal state thereof.

It is further desirable to propose a camera system, which can naturally provide a viewer with data shot at high frame rate continuously from data shot at a normal speed.

It is further desirable to propose a camera system, which can suppress the increase in memory capacity and by which a user can change a frame rate anytime.

According to an embodiment of the invention, there is provided an image converting apparatus including a memory which can store frame information of an image to be played, and an image processing section which can read frame information from the memory and convert the frame rate to a predetermined frame rate in response to a predetermined state and in accordance with the play state.

Preferably, the image processing section performs frame rate conversion not by changing the number of all images but by reducing the number of frames to be played within a predetermined period of time.

Preferably, the image processing section performs frame rate conversion not by changing the play time of all images but by reducing the number of frames to be played within a predetermined period of time.

Preferably, the image processing section creates a new frame from multiple frames stored in the memory and changes the frame rate of images within a predetermined period of time in order to create new frames to be played.

Preferably, the image converting apparatus further includes a processing engine having a calculation function for increasing or reducing the size of an image to an arbitrary size and creating a new pixel from multiple original images stored in the memory. In this case, the image processing section creates a new frame based on the processing result by the processing engine and changes the frame rate of images within a predetermined period of time.

Preferably, the processing engine calculates a new motion vector from motion vector information stored in the memory. The image processing section may create a new frame based on the new motion vector.

According to another embodiment of the invention, there is provided an image signal processing apparatus for processing an external image signal, the apparatus including a memory which can store frame information of an image to be played, and an image processing section which can read frame information from the memory and convert the frame rate to a predetermined frame rate in response to a predetermined state and in accordance with the play state.

According to another embodiment of the invention, there is provided an image signal processing apparatus for processing an external image signal, the apparatus including a memory which can store frame information of an image to be played, an image processing section which can read frame information from the memory and convert the frame rate to a predetermined frame rate in response to a predetermined state and in accordance with the play state, and a connecting section connectable by at least one display apparatus. In this case, the image processing section converts the frame rate based on at least one of the performance of a connected display apparatus and the performance of the connecting section.

Preferably, the image processing section can convert the frame rate in accordance with the internal state of the apparatus.

Preferably, the image processing section can change the frame rate in accordance with at least one of the frequency, amount of power consumption and used amount of the memory.

Preferably, the image processing section has means which can display an image on a connecting display apparatus by combining the frame rates differently.

Preferably, the image processing section has means which can display an image having an unsteady frame rate on multiple display apparatus at the same time.

Preferably, the image processing section has means which can display an image by rearranging the frame rate in accordance with the frame rate compatible with a display apparatus.

Preferably, the image processing section has means for outputting a high quality image having a low frame rate by reducing the frame rate in accordance with that of a display apparatus without decreasing the image quality of the frame with the reduced frame rate.

Preferably, the image processing section has means for recreating an image created with a frame rate out of specs to be compatible with a display apparatus.

According to another embodiment of the invention, there is provided a camera system including a shooting section shooting an image of a subject and outputting image data, and an image signal processing apparatus performing predetermined processing on image data. In this case, the image signal processing apparatus has a memory which can store frame information of an image to be played, an image processing section which can read frame information from the memory and convert the frame rate to a predetermined frame rate in response to a predetermined state and in accordance with the play state, and a connecting section connectable by at least one display apparatus. The image processing apparatus converts the frame rate based on at least one of the performance of a connected display apparatus and the performance of the connecting section.

According to another embodiment of the invention, there is provided a camera system including a shooting section shooting an image of a subject and outputting image data, and an image signal processing apparatus performing predetermined processing on image data, wherein the image signal processing apparatus has a memory, and an image processing section which can create image data having serially different frame intervals by changing the time intervals of frame images shot at a predetermined rate in a stepwise manner and saving thinned-out images in the memory.

Preferably, the image processing section can create image data having serially different frame intervals by changing the time intervals of shot frame images and saving thinned-out images in accordance with a preset arbitrary changing rate.

Preferably, the camera further includes a connecting section connectable by a display apparatus. In this case, the image processing section processes to play and display, on a display apparatus at equal intervals, all of the created frames of image data having different frame intervals in a stepwise manner, whereby the part recorded at a high frame rate is played visually in slow motion, and a part recorded at frame rates changed in a stepwise manner is played at a display speed gradually decreasing from a normal display speed to a slow motion or gradually increasing from the slow motion to the normal display speed.

Preferably, the image processing section processes to play and display, on a display apparatus at equal intervals, all of the created frames of image data having different frame intervals in an arbitrary manner, whereby the play speed is changed arbitrarily.

Preferably, the image processing section performs processing of thinning out frames in a stepwise manner on image data already recorded at a predetermined frame rate.

Preferably, the camera system further includes an input device designating a frame rate for shooting. In this case, the frame rate for shooting can be changed arbitrarily in accordance with the strength of an input to the input device.

According to another embodiment of the invention, there is provided a camera system including a shooting section shooting an image of a subject and outputting image data, an image processing section performing predetermined processing on image data, and an operation section by which changing a frame rate can be instructed during a shooting operation, wherein the shooting section can shoot an image at a frame rate changed in accordance with an instruction through the operation section.

Preferably, the operation section allows the instruction to change frame rates in a stepwise or serial manner in accordance with the strength of push of a button switch.

Preferably, the shooting section has a solid-state imaging element, and the frame rate is changed by controlling horizontal and/or vertical blanking periods without changing the driving frequency for the solid-state imaging element.

Preferably, the shooting section has a solid-state imaging element, and the frame rate is changed by selecting frames to be used without changing the driving frequency for the solid-state imaging element.

Preferably, the shooting section has a solid-state imaging element, and the frame rate of the solid-state imaging element is changed by dynamically changing the driving frequency for the solid-state imaging element.

According to another embodiment of the invention, there is provided an image signal processing method for processing an external image signal, the method including the steps of reading out frame information from a memory; and converting the frame rate to a predetermined frame rate in response to a predetermined state and in accordance with the play state.

According to the embodiments of the invention, an optimum frame rate and resolution can be obtained in accordance with a given display apparatus and/or internal state thereof.

The data shot at a high frame rate can be provided to a user continuously and naturally from the data shot at a normal speed.

The increase in memory capacity can be suppressed, and a user can change a frame rate anytime.

BRIEF DESCRIPTION OF THE DRAWINGS

FIGS. 2A to 2C are diagrams showing examples of normal play, slow play and thin-out play;

FIGS. 17A to 17C show an image data construction which can provide a display effect according to the eighth embodiment in which a part shot at a normal frame rate, a part with a frame rate changing in a stepwise manner and a part shot at a predetermined high frame rate are displayed continuously, resulting in the fade-out and fade in of the slow motion display in time;

FIG. 20 is a block diagram showing a construction example of a camera system according to a ninth embodiment of the invention;

DESCRIPTION OF THE PREFERRED EMBODIMENTS

With reference to drawings, embodiments of the invention will be described below.

First Embodiment

Figure 1:
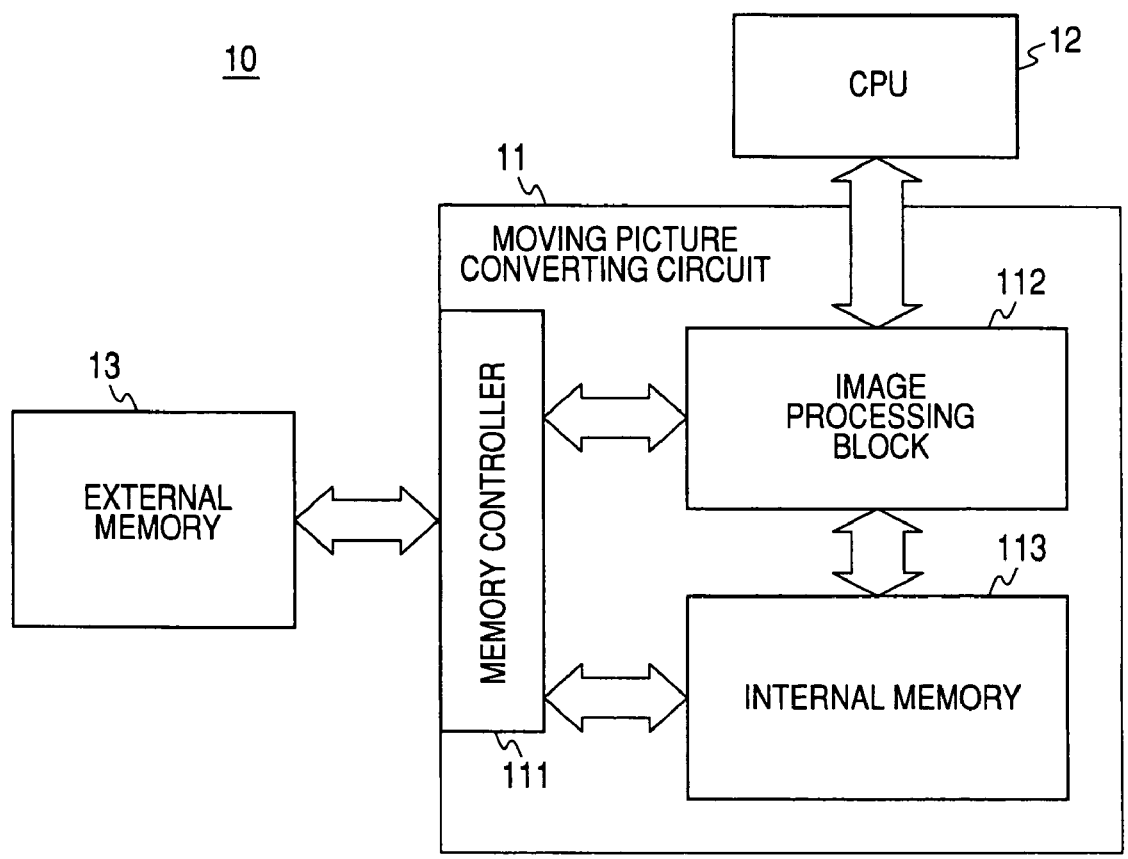
FIG. 1 is a diagram showing a construction example of a frame rate converting apparatus according to a first embodiment of the invention.

FIG. 1 is a diagram showing a construction example of a frame rate converting apparatus according to a first embodiment of the invention.

A frame rate converting apparatus 10 includes, as shown in FIG. 1, a moving picture converting circuit 11, a CPU 12 and an external memory 13.

The moving picture converting circuit 11 has a memory controller 111, an image processing block 112 and an internal memory 113.

The moving picture converting circuit 11 is controlled by the CPU 12 and basically converts the frame rate of a moving picture in the external memory 13.

Here, a method for playing a moving picture at one frame rate will be described in some details.

FIGS. 2A to 2C are diagrams showing examples of so-called normal play, slow play and thin-out play.

There are three methods including a first method for playing a picture as it is, a second method by which the number of the entire moving pictures to be played is not changed though the number of frames to be played in one second is reduced and a third method by which the time for playing the entire moving pictures is not changed by selecting frames to be played and reducing the number of frames to be played in one second. In this case, the second method results in slow play since the play time is increased from that for the original moving pictures. The third method reduces motions in small units from that of the original moving pictures.

FIGS. 2A to 2C show the normal play, slow play and thin-out play corresponding to the three methods at 240 fps.

In addition, the number of images to be played in one second may be increased.

The method for selecting frames to be played in order to reduce the number of frames to be played in one second includes a method in which some frames are selected and played as they are and a method in which a frame for play is newly created by averaging multiple frames, for example.

The frame rate converting apparatus 10 according to the first embodiment is an example of the circuit, which can implement those methods and convert the frame rate of a moving picture.

As described above, the moving picture converting circuit 11 of the frame rate converting apparatus 10 converts the frame rate of a moving picture on the external memory 13 under the control of the CPU 12.

The moving picture converting apparatus 11 reads and writes the frame to be played only from the external memory 13 through the memory controller 111 in order to only select the frame to be played.

The moving picture converting apparatus 11 reads multiple frames to the internal memory 113 once through the memory controller 111 in order to create a new frame to be played. Then, the image processing block 112 calculates and creates an optimum frame from the multiple frames within the internal memory 113 and writes the frame on the external memory 13 through the memory controller 111.

The method for calculating and creating an optimum frame from multiple frames can be defined from the CPU 12.

Figure 3:
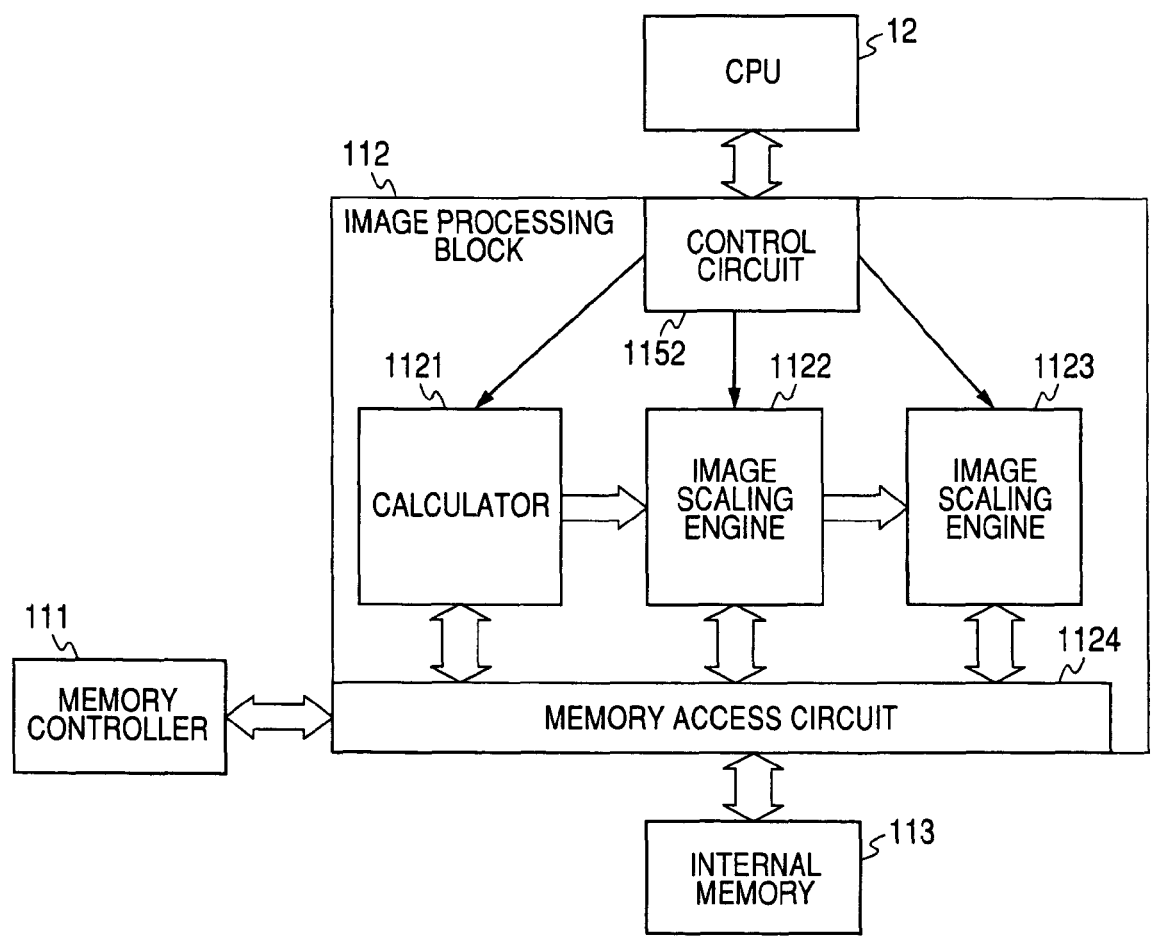
FIG. 3 is a diagram showing a construction example of an image processing block of the moving picture converting circuit in FIG. 1.

FIG. 3 is a diagram showing a construction example of the image processing block of the moving picture converting circuit in FIG. 1.

The image processing block 112 has, as shown in FIG. 3, a calculator 1121, an image scaling engine 1122, an image scaling engine 1123, a memory access circuit 1124, and a control circuit 1152.

The memory access circuit 1124 accesses the memory controller 111 and internal memory 113 for reading/writing data therefrom/thereto.

The control circuit 1152 controls operations of the calculator 1121, image scaling engine 1122 and image scaling engine 1123 in accordance with the frame calculating method defined from the CPU 12.

The image scaling engines 1122 and 1123 are circuits each having a calculation function for scaling an image to an arbitrary size. The functions may be implemented by filtering and calculating the color and intensity information of a new pixel from the colors and intensity information of multiple pixels within one image.

Figure 4B:
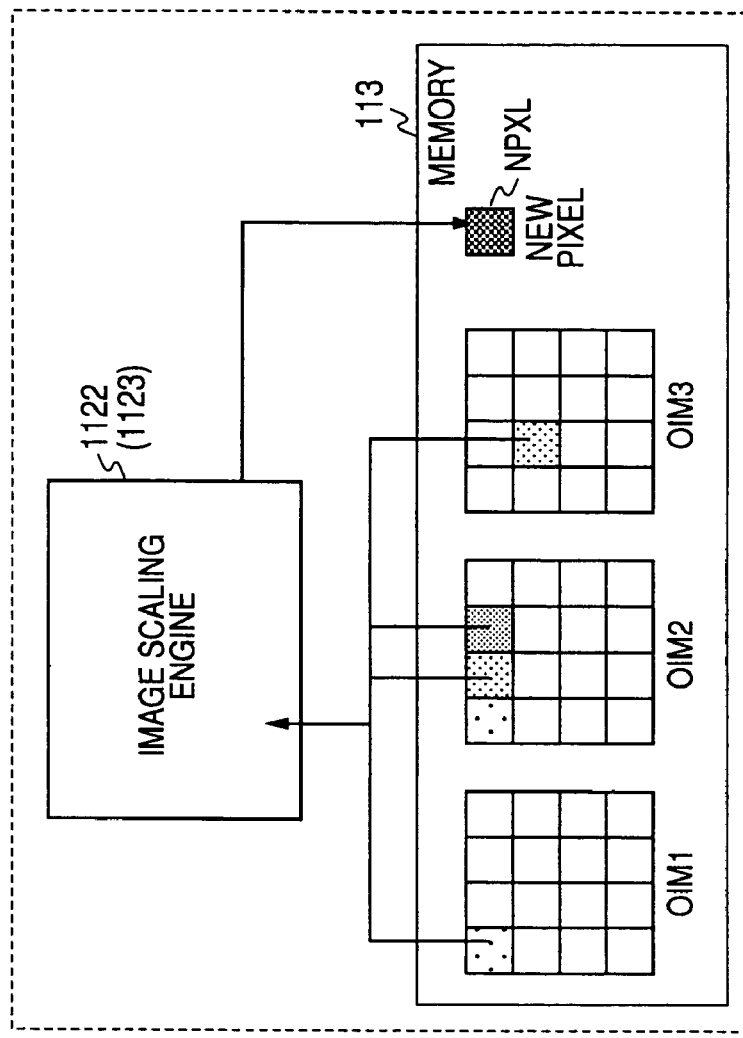
FIGS. 4A and 4B are diagrams showing examples of scaling processing by an image scaling engine according to the embodiment.
Figure 4A:
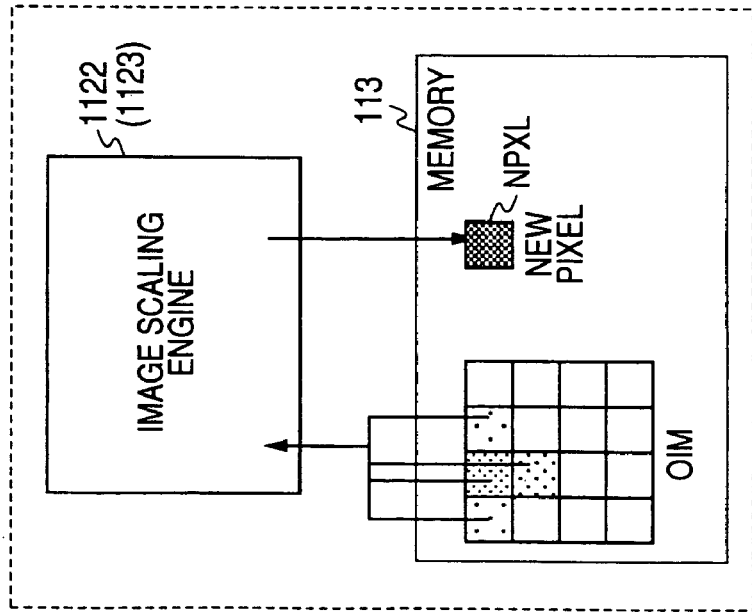

FIGS. 4A and 4B are diagrams showing scaling processing examples by the image scaling engines according to this embodiment. FIG. 4A shows normal scaling processing, and FIG. 4B shows scaling processing during frame rate conversion.

As shown in FIG. 4A, the image scaling engine 1122 (or 1123) creates a new pixel NPXL from multiple pixels of an original image OIM on the memory 113.

Then, it is used as shown in FIG. 4B for use in frame rate conversion.

In frame rate conversion in FIG. 4B, the image scaling engine 1122 (or 1123) creates a new pixel NPXL from multiple original images OIM1, OIM2 and OIM3 on the memory 113.

The capability of creating a new frame from multiple frames can increase or decrease the frame rate of the moving picture in a predetermined period of time.

In MPEG, the value of a motion vector indicates the stroke of each pixel with respect to the previous and subsequent frames and may be used instead.

The motion vectors at multiple times are input to the image scaling engines 1122 (or 1123), whereby a motion vector at a different time can be calculated. The new motion vector may be used to create a new image.

In the case in FIG. 3, the calculator 1121 is also used for image creation. In order to process a non-MPEG moving picture, the motion vectors may be calculated by the calculator 1121 from frames at multiple times.

Figure 5:
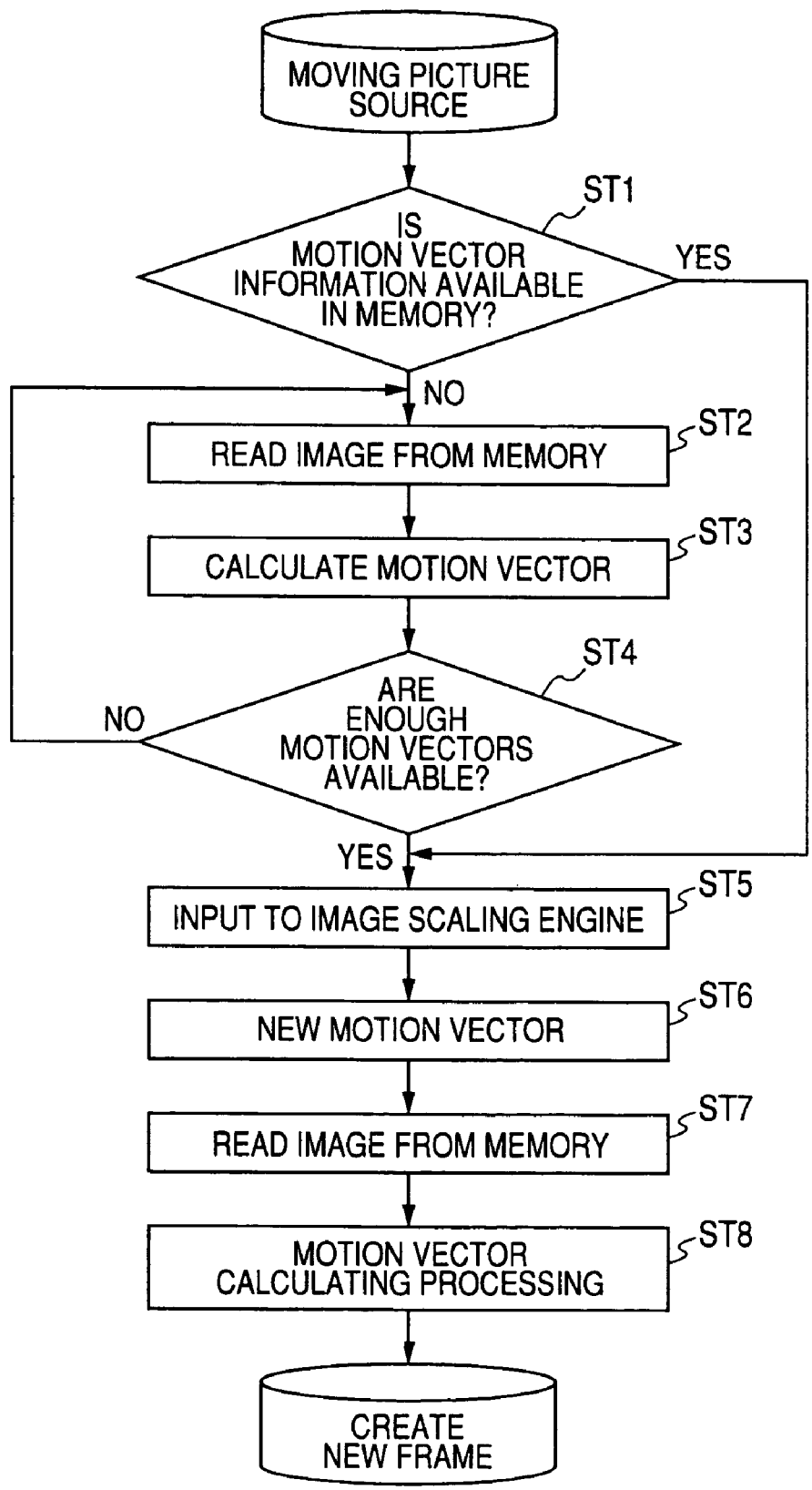
FIG. 5 is a flowchart showing processing steps for calculating a motion vector in processing a moving picture by the image scaling engine according to the embodiment.

FIG. 5 is a flowchart showing processing steps of calculating a motion vector in processing a moving picture in the image scaling engine according to this embodiment.

In this case, whether the memory 113 has motion vector information or not is determined (ST1). If not, an image is read from the external memory 13 (ST2), and the calculator 1121 calculates a motion vector (ST3). If the memory 113 has motion vectors enough (ST4), the motion vectors are input to the image scaling engine (ST5), whereby a new motion vector is calculated (ST6).

Next, the image is read from the memory 13 (ST7), and the calculator 1121 calculates the motion vector (ST8) The new motion vector is used to create a new frame (ST9).

The methods in FIGS. 4A and 4B and 5 may be used at the same time.

Since the circuit of the image processing block 112 shown in FIG. 3 has two image scaling engines, both of the scaling conversion of a moving picture and conversion of a frame rate may be performed.

With one scaling engine only, the same processing as the case with two scaling engines can be performed by controlling and operating the image scaling engine twice by the control circuit 1125.

Any numbers of image scaling engines and calculators may be provided in the image processing block 112.

Thus, the application of the image processing block 112 including the control circuit 1152 shown in FIG. 3 can implement the scaling conversion on a moving picture and frame rate conversion.

Instead of these methods, a simpler method may be used for the conversion by selecting and saving a necessary frame without calculation. The conversion method may be selected arbitrarily.

Second Embodiment

Figure 6:
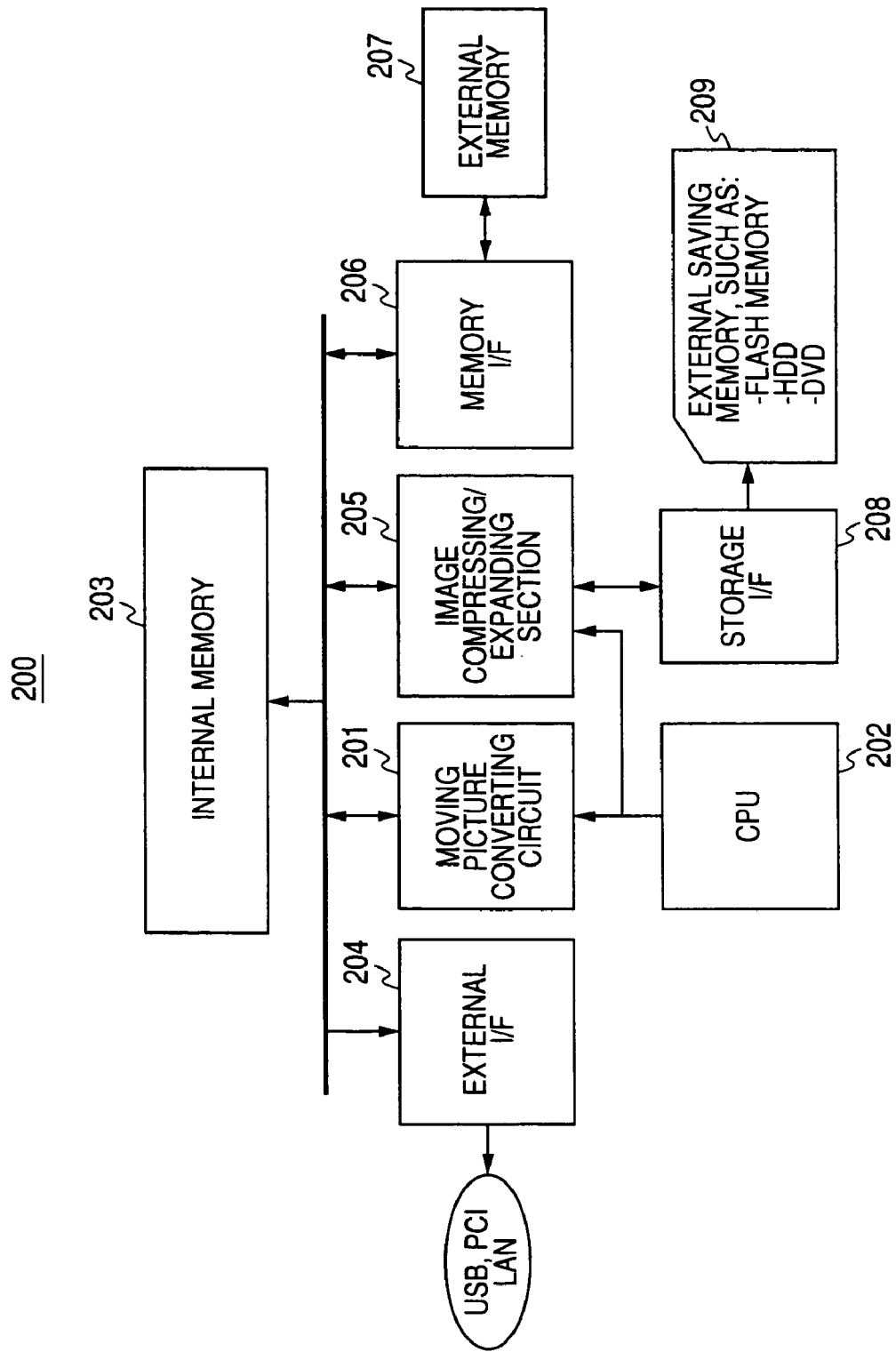
FIG. 6 is a block diagram showing a construction example of an image signal processing apparatus according to a second embodiment of the invention.

FIG. 6 is a block diagram showing a construction example of an image signal processing apparatus according to a second embodiment of the invention.

The image processing apparatus has a construction applying the frame rate converting apparatus according to the first embodiment.

An image signal processing apparatus 200 includes a moving picture converting circuit 201, a CPU 202, an internal memory 203, an external interface (I/F) 204, an image compressing/expanding section 205, a memory interface (I/F) 206, an external memory 207, a storage interface (I/F) 208 and an external saving memory 209.

The image signal processing apparatus 200 in FIG. 6 is configured to function as an LSI internally containing the converting apparatus according to the first embodiment, for example.

In FIG. 6, the moving picture converting circuit 201, the CPU 202, the external saving memory 209 and/or external memory 207 correspond to the moving picture converting circuit 11 in FIG. 1, the CPU 12 in FIG. 1 and the external memory 13 in FIG. 1, respectively.

FIG. 6 shows an example in which the internal memory 203 is connected to the moving picture converting circuit 201 via a bus.

These constructions and functions are the same as those of the first embodiment, and the detail description will be omitted herein.

The CPU 202 controls over the moving picture converting circuit 201, image compressing/expanding section 205 and the entire circuit, for example.

The external interface 204 functions as an interface allowing the connection of a USB and a PCI, for example.

The image compressing/expanding section 205 may have a decoder function of reading and expanding the compressed data stored in the internal memory 203 functioning as an image memory and an encoding function of creating an image source by performing signal compressing processing on multiple image data pieces such as signals from a camera.

The image compressing/expanding section 205 may save image data to the image saving memory 209 through the storage interface 208 or play image data from the memory 209.

The image saving memory 209 may be a flash memory, an HDD or a DVD, which is a non-volatile memory.

In the image signal processing apparatus 200, the image compressing/expanding section 205 may encode or decode a moving picture. A moving picture in the external saving memory 209 may be decoded by the image compressing/expanding section 205 and be processed in the moving picture converting circuit 201. A moving picture may be encoded by the image compressing/expanding section 205 again and be written in the external saving memory 209 or be output from the external interface 204.

The use of this apparatus allows the easy conversion of the resolution and frame rate of a moving picture. As a result, a moving picture having different resolutions and/or frame rates can be easily handled. Furthermore, a moving picture with a frame rate and/or resolution out of specs may be displayed without changing those of the original file.

Third Embodiment

Figure 7:
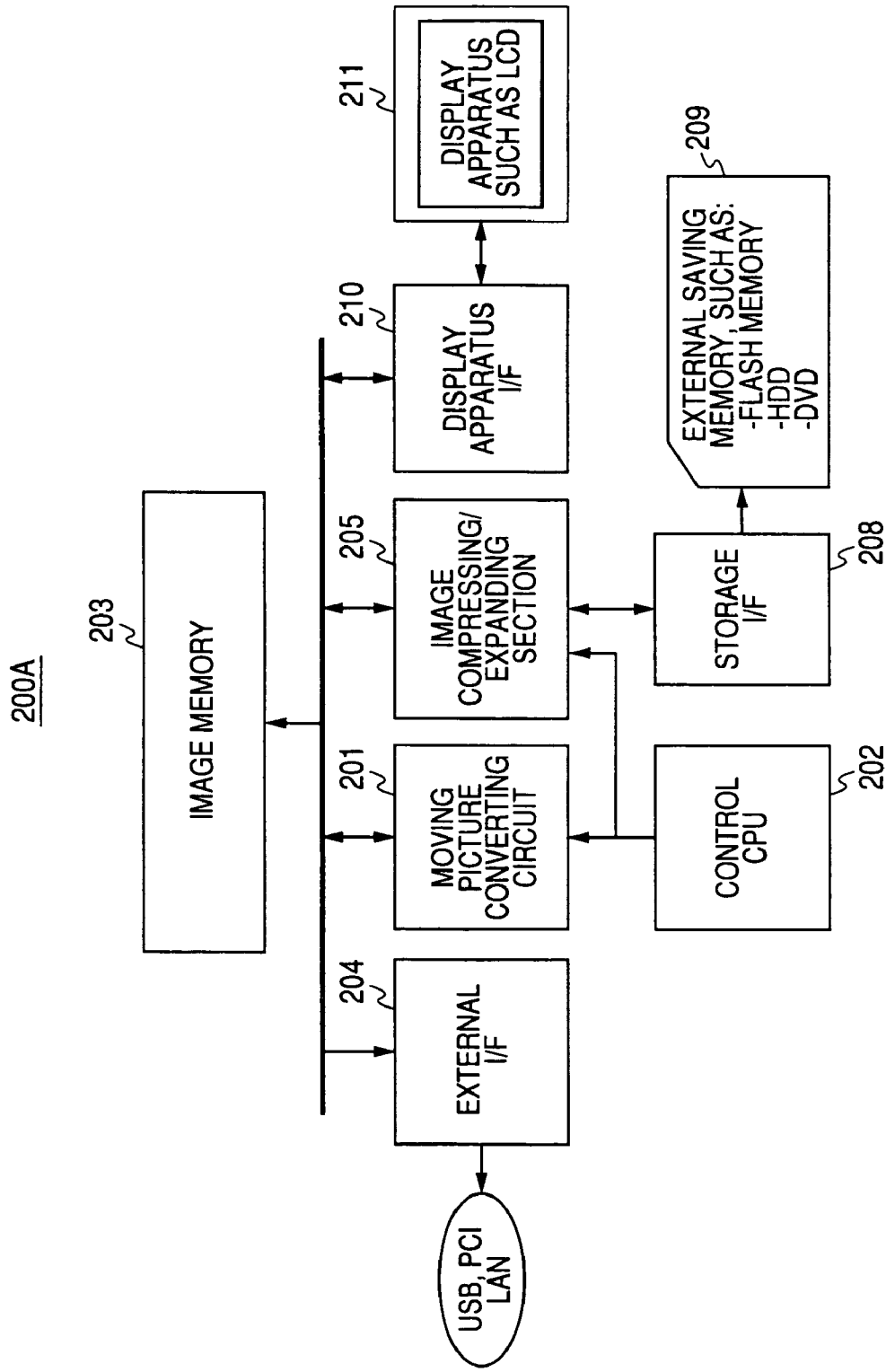
FIG. 7 is a block diagram showing a construction example of an image signal processing apparatus according to a third embodiment of the invention.

FIG. 7 is a block diagram showing a construction example of an image signal processing apparatus according to a third embodiment of the invention.

The image signal processing apparatus has a construction applying the converting apparatus according to the first embodiment.

An image signal processing apparatus 200A according to the third embodiment is different from the image signal processing apparatus 200 according to the second embodiment in that a display apparatus interface 210 and a display apparatus 211 are further provided therein instead of the memory interface 206 and the external memory 207 and that a moving picture can be output by changing the resolution and/or frame rate in accordance with a connected device or display apparatus.

The display apparatus interface 210 outputs image data to be displayed to a display apparatus 211 to display a still picture or a moving picture.

The display apparatus 211 may be a liquid crystal display (LCD), for example.

In the image signal processing apparatus 200A in FIG. 7, the image compressing/expanding section 205 may be used to decode and write a moving picture file on the external saving memory 209 into an image memory. Conversely, the image compressing/expanding section 205 may encode the moving picture file.

When a USB is used to connect to an external device, the USB has, by standard, an identifier for identifying the device, such as a vender ID and a product ID. If the circuit has a database of the performance of the device in a memory thereof, the control CPU 202 can determine the performance of the connected device.

When a LAN is used for the connection, the name and performance of a connected device can be identified by the specs for communicating the information on the device.

The performance of the display apparatus 211 can be easily recognized through the display apparatus interface 210 by the specs for communicating the information.

If the communication of information with the display apparatus 211 is not available, the performance may be determined from a change in voltage upon connection within specs. Furthermore, the maximum size of an image displayable by the display apparatus 211 may be determined thereby. When the external interface 204 such as a USB is used to connect the display apparatus 211, the recognition may be allowed as described above.

Based on the performance, the control CPU 202 determines a proper resolution and frame rate and controls the moving picture converting circuit 201.

The control CPU 202 decreases the resolution and frame rate from those of the original moving picture if the performance of a connected device or display apparatus is low. Conversely, the resolution and frame rate may be increased if the performance of a connected device or display apparatus is high.

The moving picture converting circuit 201 may be controlled in accordance with not only the performance of the connected device or display apparatus but also the performance of a connecting interface. The resolution and frame rate may be increased or decreased from those of the original moving picture in accordance with the transfer rate of the connecting interface.

If the performance of a connected device or display apparatus is not available, the resolution and frame rate of a moving picture are converted to standard values or basic values such as the lowest values. The basic values may be defined by a user freely (or arbitrarily).

Figure 8:
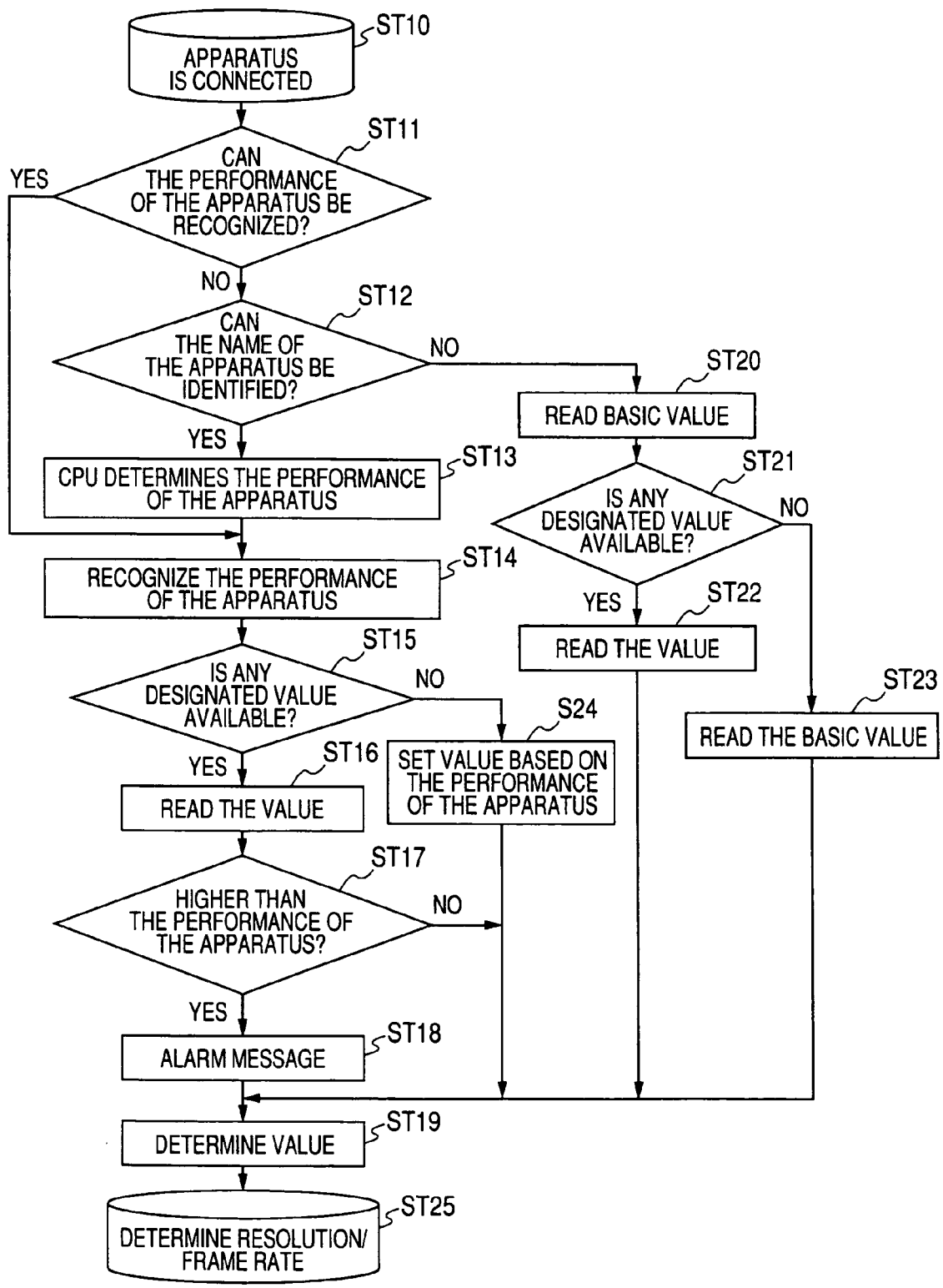
FIG. 8 is a flowchart showing processing of changing a resolution and a frame rate in accordance with a connected device or display apparatus.

FIG. 8 is a flowchart showing processing of changing the resolution and frame rate in accordance with a connected device or display apparatus.

For example, a display apparatus is connected (ST10). After the performance of the display apparatus is recognized (ST11), whether the name of the apparatus can be identified or not is determined (ST12). When the name of the apparatus can be determined, the CPU 202 determines the performance of the apparatus (ST13). Then, the performance of the apparatus is recognized (ST14).

Next, whether any value has been designated or not is determined (ST15). If any, the value is read (ST 16), and whether the value is higher than the performance of the apparatus or not is determined (ST17).

If higher, an alarm message is issued (ST18), and the processing moves to the processing of value determination in step ST19.

If the name of the apparatus is not identifiable in step S12, the basic value is read (ST20), and whether any value has been designated or not is determined (ST21). If any, the value is read (ST22) If not, the basic value is read (ST23), and the processing moves to the processing of value determination in step S19.

If no value has been designated in step ST15, the value is defined based on the performance of the apparatus (ST24), and the processing moves to the processing of value determination in step ST19.

Then, the value is determined, and a proper resolution and frame rate are determined (ST25).

Without using these functions, a user may designate an arbitrary resolution and frame rate and cause the conversion thereto. If the performance of a connected device or display apparatus can be recognized and the designated resolution and frame rate are higher than the performance, the control CPU 202 issues alarm information to a user.

The use of the apparatus allows the automatic conversion of a moving picture to an optimum resolution and frame rate in accordance with the performance of a connected device or display apparatus. Even a moving picture with a high resolution and a high frame rate may be automatically converted to the one processable by a connected device or display apparatus. Thus, the moving picture can be easily played or output.

Fourth Embodiment

Figure 9:
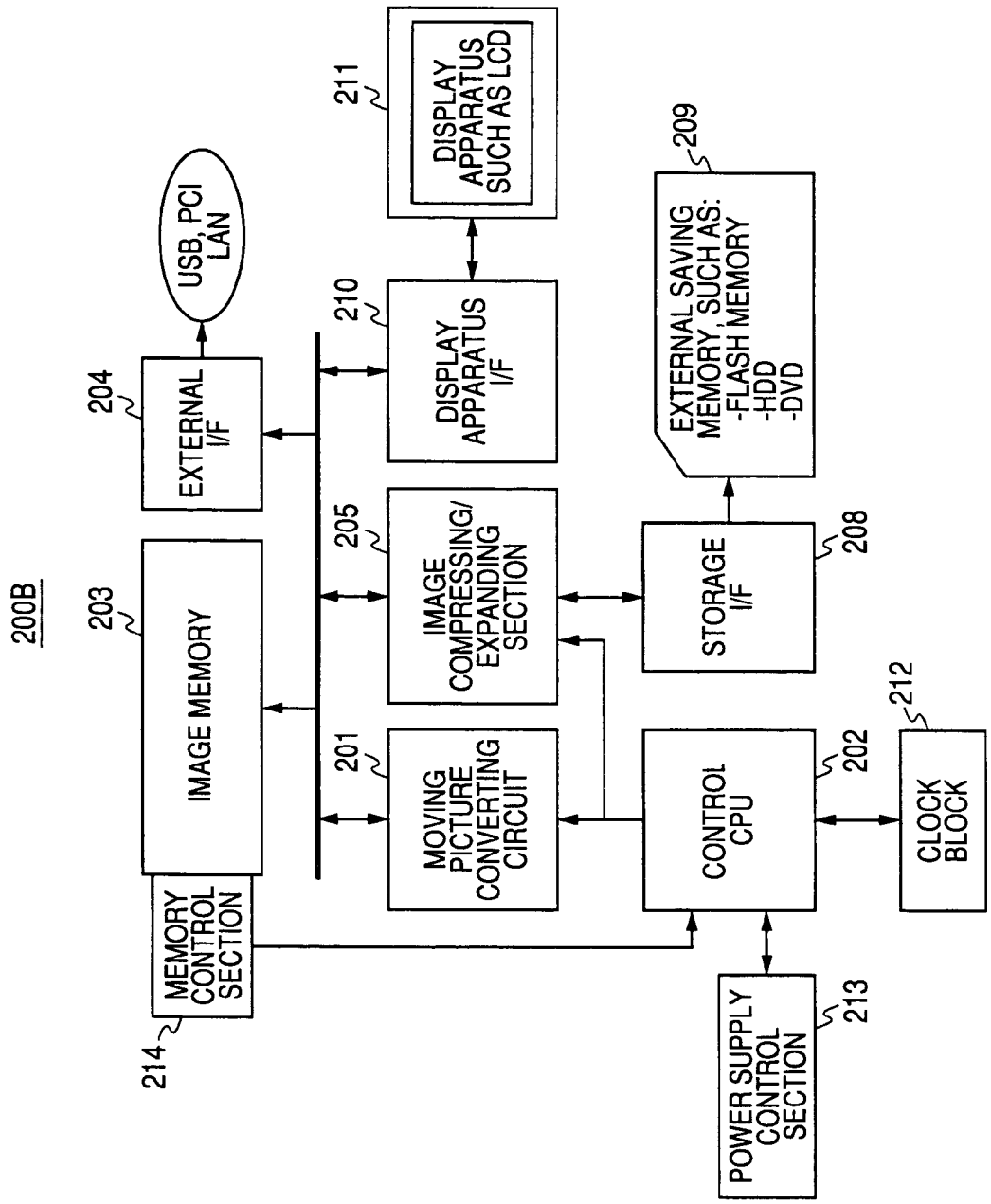
FIG. 9 is a block diagram showing a construction example of an image signal processing apparatus according to a fourth embodiment of the invention.

FIG. 9 is a block diagram showing a construction example of an image signal processing apparatus according to a fourth embodiment of the invention.

The image processing apparatus has a construction applying the converting apparatus according to the first embodiment.

An image signal processing apparatus 200B according to the fourth embodiment is different from the image signal processing apparatus 200A according to the third embodiment in that the image signal processing apparatus 200B includes a clock block 212, a power supply control section 213 and a memory control section 214 in addition to the construction in FIG. 7 and can autonomously convert the resolution and frame rate of a moving picture in accordance with the state within the circuit apparatus.

The clock block 212 controls the frequency of the entire circuit apparatus and has a function of informing the control CPU 202 of frequency information.

The power supply control section 213 controls the power supply of the entire circuit apparatus and functions of informing the control CPU 202 of the power consumption of the entire circuit apparatus. In mobile equipment, the remaining amount of a battery thereof may be informed to the control CPU 202.

The memory control section 214 has a function of informing the control CPU 202 of the access state to the image memory 203 and the amount of an unused area of a memory.

In general, the amount of processable data decreases as the frequency of a circuit therefor decreases. Thus, the processable resolution and frame rate of a moving picture depends on the frequency.

Hence, a moving picture can be processed smoothly by converting the resolution and frame rate of the moving picture to optimum values by the control CPU 202 in accordance with the information on the frequency.

Conversely, the control CPU 202 may instruct the clock block 212 to increase or decrease the frequency of the circuit in accordance with the resolution and frame rate of a moving picture.

As the amount of data access increases, the power consumption of the entire circuit increases. Thus, the power consumption may depend on the resolution and frame rate of a moving picture.

Hence, the power consumption can be decreased by converting the resolution and frame rate of a moving picture to optimum values by the control CPU 202 in accordance with the information on the current power consumption and remaining amount of the battery.

Conversely, the control CPU 202 may instruct the power supply control section to increase or decrease the voltage of the circuit in accordance with the resolution and frame rate of a moving picture.

Handling a moving picture with a high resolution and frame rate increases the amount of used memory and increases the frequency of access to the memory. An extremely small area available in the memory may prevent processing, which may terminate or delay the display or output of a moving picture.

Accordingly, a moving picture can be displayed or output smoothly by instructing the resolution and frame rate to the moving picture converting circuit by the CPU 202 in accordance with the remaining amount of an available memory and/or the access state to the memory.

The memory access, power consumption and frequency may be decreased by selecting a simple converting method.

These functions may be used in combination. The relationship between the frequency, power consumption, used amount of a memory and the resolution and frame rate may be defined by a user.

The use of the circuit apparatus can implement a moving picture playing system with low power consumption and a long-time moving picture playable system.

Fifth Embodiment

Figure 10:
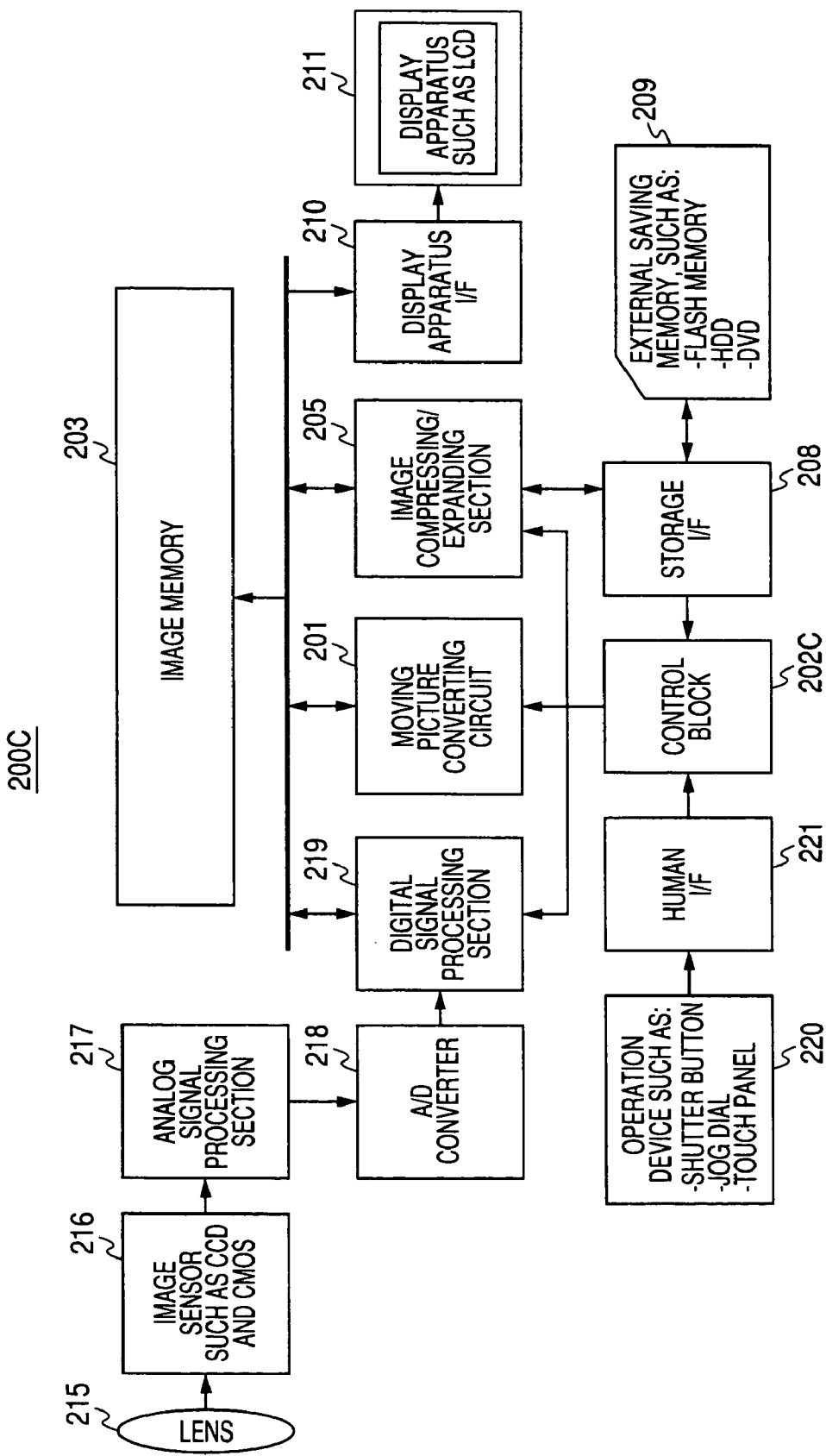
FIG. 10 is a block diagram showing a construction example of an image signal processing apparatus according to a fifth embodiment of the invention.

FIG. 10 is a block diagram showing a construction example of a camera system adopting an image signal processing apparatus according to a fifth embodiment of the invention.

A camera system 200C including the image signal processing apparatus according to the fifth embodiment includes, in addition to the construction in FIG. 7 showing the image signal processing apparatus 200A according to the third embodiment, an optical system 215, an image sensor (imaging apparatus) 216 including a CCD and a CMOS sensor, an analog signal processing section 217, an analog/digital (A/D) converter 218, a digital signal processing section 219, an operation device 220, and a human interface 221. For the system construction, no external interface is provided therein.

An imaging section includes the optical system 215, the image sensor (imaging apparatus) 216 including a CCD and a CMOS sensor and the analog signal processing section 217.

The optical system 215 mainly includes a lens, and an image of a subject, not shown, is formed on the photoreceptive plane of the image sensor 216, which is an imaging element.

The image sensor 216 photoelectronically converts and outputs the information on the subject image, which is formed through the optical system 215, to the analog signal processing section 217.

The analog signal processing section 217 performs Correlated Double Sampling (CDS) processing, analog amplification processing and so on on the analog output of the image sensor 216 and outputs the processed analog image data to the A/D converter 218.

The A/D converter 218 converts the analog image data by the analog signal processing section 217 to digital signals and outputs the digital signals to the digital signal processing section 219.

The digital signal processing section 219 may perform processing of determining the shutter speed for shooting before shooting, processing for adjusting the brightness and/or color of a shot image and processing of compressing shot image data in accordance with a compressing scheme, which will be described in detail later, in the image memory 203, which is a recording medium, reading out and expanding (or decompressing) the written image data from the image memory 203.

The control block (or CPU) 202C includes the control CPU, power supply control section, memory control section and clock block according to the fourth embodiment, for example. The use of the control block 202C can implement the functions according to the first to fourth embodiments.

The control block 202C performs control in accordance with an operation on the operation device 220 through the human interface 221.

The operation device 220 includes a shutter button, a jog-dial and a touch panel.

The camera system 200C may shoot a still picture and/or a moving picture, save to a storage, and play or output a moving picture on the storage.

In order to create a still picture or a moving picture, the image sensor 216 first transforms and captures the light from the lens of the optical system 215 to electric signals. The signals are converted to image signals through the analog signal processing section 217, A/D converter 218, and digital signal processing section 219.

The image signals are encoded by the image compressing/expanding section 205, whereby a file of the still picture or moving picture is created. The created file may be saved in the memory 209 through the storage interface 208.

In order to play the picture, the file on the storage is read and decoded by the image compressing/expanding section 205. The result is processed by the moving picture converting circuit 201, is read by the display apparatus interface 210 and is displayed on the display apparatus 211 such as an LCD.

The image signals may be processed by the moving picture converting circuit 201 and be displayed on the display apparatus 211 as they are without encoding by the image compressing/expanding section 205. In this case, the one being shot currently through the optical system 215 is displayed in realtime.

The use of the functions according to the first to fourth embodiments allows the conversion of the resolution and frame rate of a still picture or moving picture to display. However, the still picture or moving picture may be displayed with the unconverted, original resolution and frame rate.

The low power consumption moving picture playing system and long-time moving picture playable apparatus can be implemented. The shooting and display with the camera system allows the automatic display of one moving picture file at an optimum state on a display apparatus, which can save the storage area.

Sixth Embodiment

Figure 11:
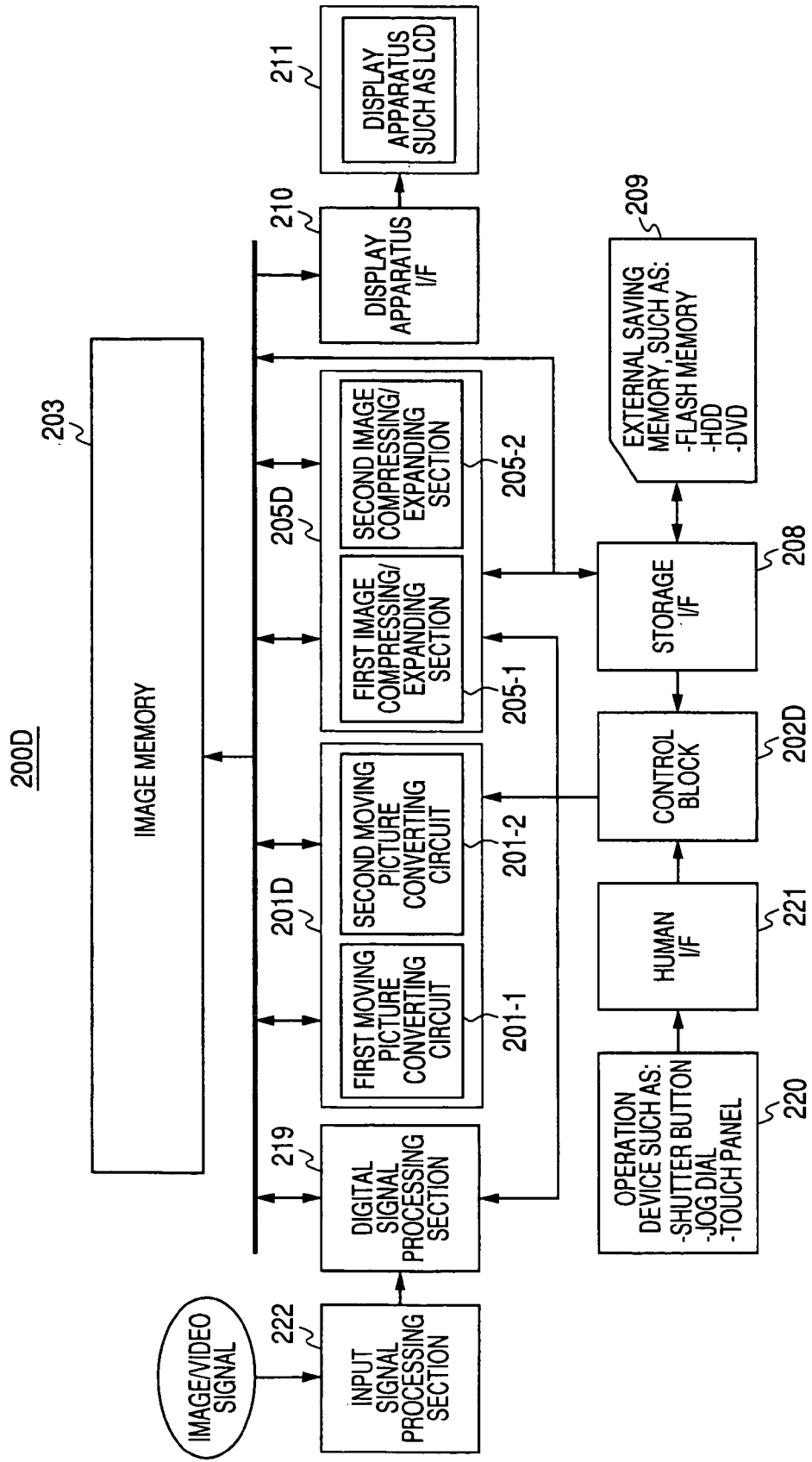
FIG. 11 is a block diagram showing a construction example of an image signal processing apparatus according to a sixth embodiment of the invention.

FIG. 11 is a block diagram showing a construction example of an image signal processing apparatus according to a sixth embodiment of the invention.

An image signal processing apparatus 200D according to the sixth embodiment is different from the camera system 200C of the fifth embodiment in that an input signal processing section 222 is provided on the input side of the digital signal processing section 219 instead of the optical system 215, image sensor (imaging apparatus) 216, analog signal processing section 217 and A/D converter 218.

In the image signal processing apparatus 200D, a moving picture converting circuit 201D and image compressing/expanding section 205D internally contain multiple circuits.

In this embodiment, the moving picture converting circuit 201D includes two circuits of a first moving picture converting circuit 201-1 and a second moving picture converting circuit 201-2. The image compressing/expanding section 205D also includes two circuits of a first image compressing/expanding section 205-1 and a second image compressing/expanding section 205-2.

The control block 202D controls the entire apparatus and defines operations. A still picture or moving picture input from the input signal processing section 222 may be displayed or be saved in a storage. Alternatively, a still picture or a moving picture on a storage may be displayed.

The input signal processing section 222 can convert input image or video signals to a form processable by the digital signal processing section 219. The input signal processing section 222 also functions as an A/D converter if analog signals are input thereto.

The image compressing/expanding section 205D encodes the image or video signals processed by the digital signal processing section 219, whereby a file of the still picture or moving picture can be created. The file is recorded in the memory 209 through the storage interface 208.

The moving picture converting circuit 201D can convert the resolution and frame rate of a picture before encoded. The file on a storage may be decoded by the image compressing/expanding section 205D and then be displayed on the display apparatus 211 through the display apparatus interface 210. The resolution and frame rate may be converted by the moving picture converting circuit 201D after decoded.

A moving picture may be not only played after the conversion but also be encoded again and saved on a storage. Thus, the moving picture can be saved with the converted resolution and frame rate. Saving with a decreased resolution and frame rate can decrease the size of a file.

Since the moving picture converting circuit 201D and image compressing/expanding section 205D have multiple circuits according to this embodiment, one moving picture file may be displayed simultaneously by multiple playing methods. Different scenes may be also started to play, and different play starting points can be designated.

This is allowed by designating the points to be decoded by the image compressing/expanding section 205D. After that, each of the moving picture converting circuits 201D is instructed to handle the moving picture processed by the image compressing/expanding section 205-1 or 205-2, whereby the play starting point may be freely selected.

Different values of the resolution and frame rate may be defined between the moving picture converting circuits 201-1 and 201-2. The created moving pictures may be required to reduce so as to display on the same display apparatus 211 at the same time.

Figure 12:
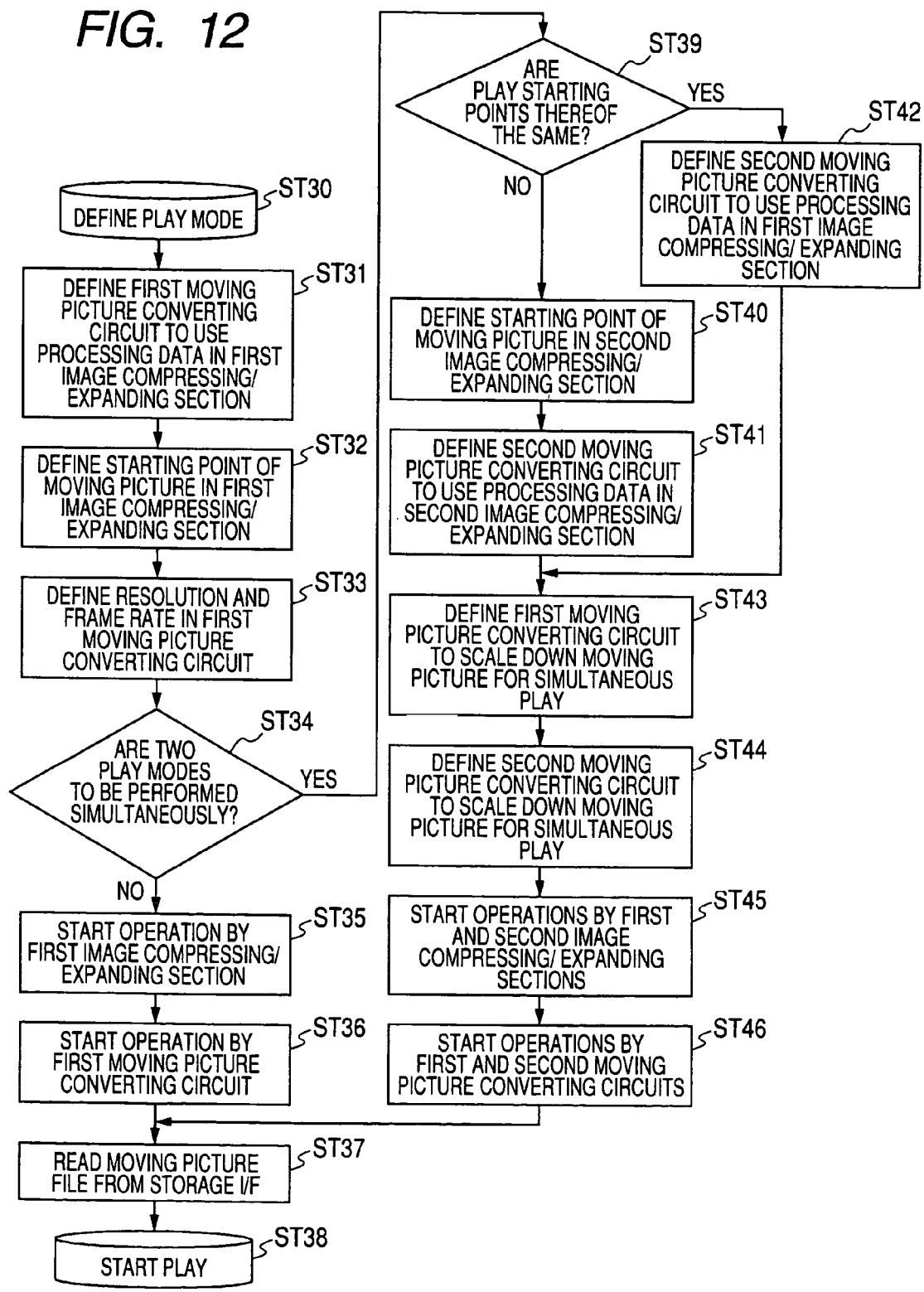
FIG. 12 is a flowchart showing an operation example of play in two forms according to the sixth embodiment.

FIG. 12 is a flowchart showing an operation example in which a moving picture is played in two forms according to the sixth embodiment.

In the example in FIG. 12, in defining a play mode (ST30), the first moving picture converting circuit 201-1 is defined to use the processed data by the first image compressing/expanding section 205-1 (ST31).

Next, the starting point for the moving picture is defined in the first image compressing/expanding section 205-1 (ST32). Next, the resolution and frame rate are defined in the first moving picture converting circuit 201-1 (ST33).

Then, whether the simultaneous display in two forms are to be performed or not is determined (ST34).

If not, the operation by the first image compressing/expanding section 205-1 is started (ST35), and the operation by the first moving picture converting circuit 201-1 is started (ST36).

Then, the moving picture file is read from the memory 209 through the storage interface 208 (ST37) and is started to play (ST38).

On the other hand, if the play in two forms is determined in step ST34, whether the play starting points are the same or not is determined (ST39). If not, the starting point of the moving picture is defined in the second image compressing/expanding section 205-2 (ST40), and the second moving picture converting circuit 201-2 is defined to use the processed data by the second image compressing/expanding section 205-2 (ST41). On the other hand, if the starting points are the same, the second moving picture converting circuit 201-2 is defined to use the processed data by the first image compressing/expanding section 205-1 (ST42).

Next, the first moving picture converting circuit 201-1 is defined to reduce the size of the moving picture for the simultaneous play (ST43), and the second moving picture converting circuit 201-2 is defined to reduce the size of the moving picture for the simultaneous play (ST44).

Then, the operations by the first and second image compressing/expanding sections 205-1 and 205-2 are started (ST45), and the operations by the first and second moving picture converting circuits 201-1 and 201-2 are started (ST46). Then, the processing moves to step ST37 above.

The converting methods may be changed. The display apparatus interface 210 displays the created multiple moving pictures on one screen.

Figure 13:
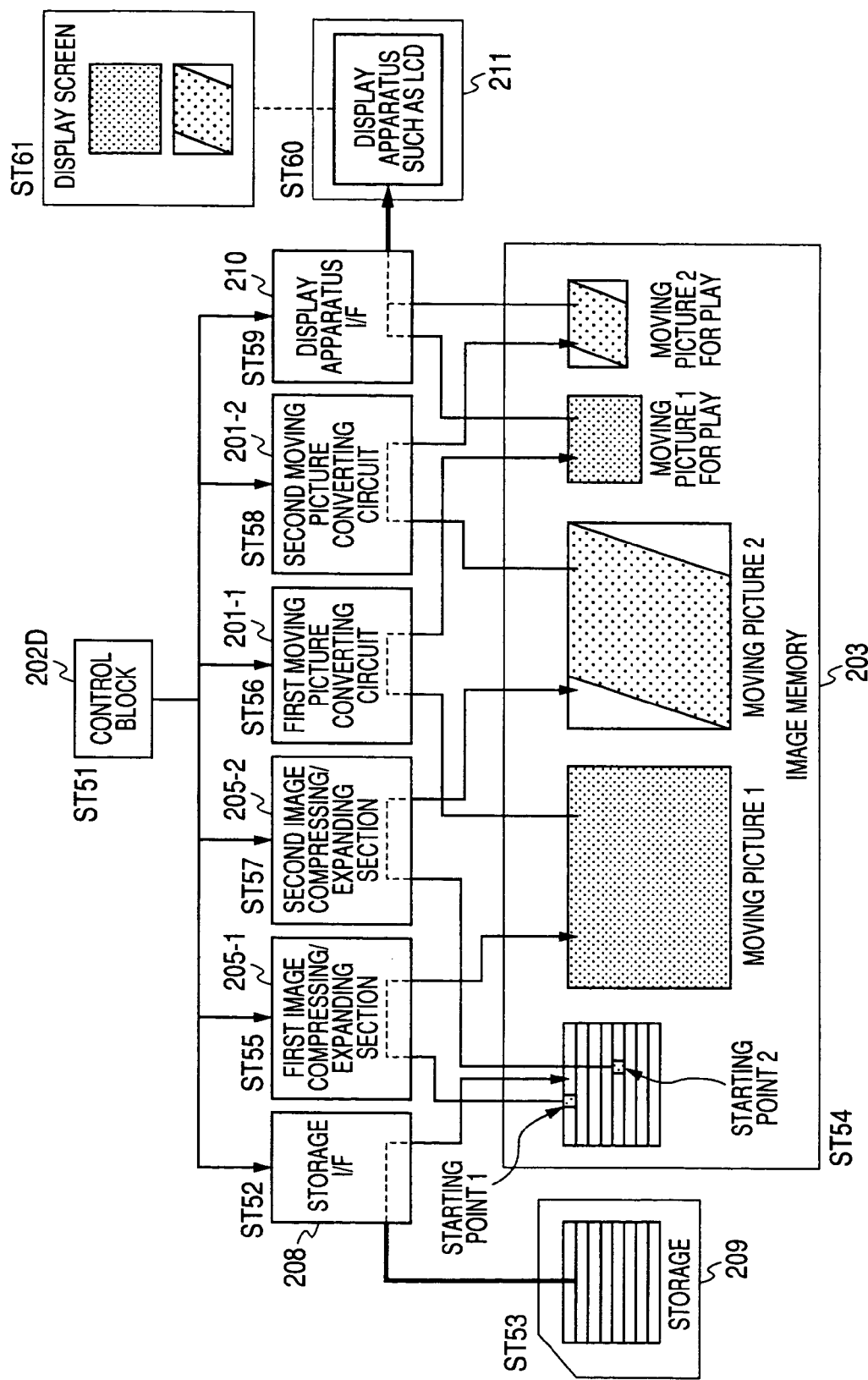
FIG. 13 is a diagram showing a circuit operation example of the image signal processing apparatus in FIG. 11.

FIG. 13 is a diagram showing a circuit operation example of the image signal processing apparatus in FIG. 11.

According to the sixth embodiment, the control block 202D controls and defines the operations of the blocks in step ST51 as shown in FIG. 13.

First of all, in steps ST52 to ST54, the storage interface 208 reads a moving picture file to be played from the storage (memory) 209 to the image memory 203.

Next, in step ST55, the first image compressing/expanding section 205-1 starts decoding from the defined starting point and writes the moving picture in the image memory 203.

In step ST56, the first moving picture converting circuit 201-1 reads the moving picture and converts the resolution and frame rate of the moving picture to the defined ones. The conversion also includes an operation for reducing the size of the moving picture to a proper size for multi-display on one screen. The moving picture for play created as a result is written in the image memory.

Simultaneously with the operations by the first image compressing/expanding section 205-1 and first moving picture converting circuit 201-1, the second image compressing/expanding section 205-2 in step ST57 and the second moving picture converting circuit 201-2 in step ST58 also read the same moving picture file and write a moving picture for play in another form in the image memory 203.

The created multiple moving pictures for play on the image memory 203 are synthesized by the display apparatus interface 210 in step ST59, which is then displayed on the display apparatus 211 in step ST60.

In step ST61, multiple moving pictures for play of one moving picture file may be displayed at the same time as shown in the display screen of the display apparatus 211.

Though the two forms of a moving picture are only played simultaneously in this embodiment, more forms may be played simultaneously by providing two or more image compressing/expanding sections and moving picture converting circuits within the image signal processing apparatus.

Only one image compressing/expanding section and moving picture converting circuit may implement the play of multiple forms by operating them multiple times for one play. Thus, the numbers of the image compressing/expanding sections and moving picture converting circuits may not have to be equal.

According to the sixth embodiment, since multiple moving pictures of one moving picture file can be started to play from different points on one screen, a user of the system can check the contents of the moving picture file faster than before. A user may identify a proper resolution, frame rate and converting method by displaying and comparing multiple moving pictures played with different resolutions, frame rates and converting methods on one screen.

As a result, the size of the file can be decreased easily without deteriorating the picture quality of the moving picture file by saving the moving picture file with a reduced resolution and frame rate. The system itself may compare the resolutions and frame rates and convert them automatically.

Seventh Embodiment

Figure 14:
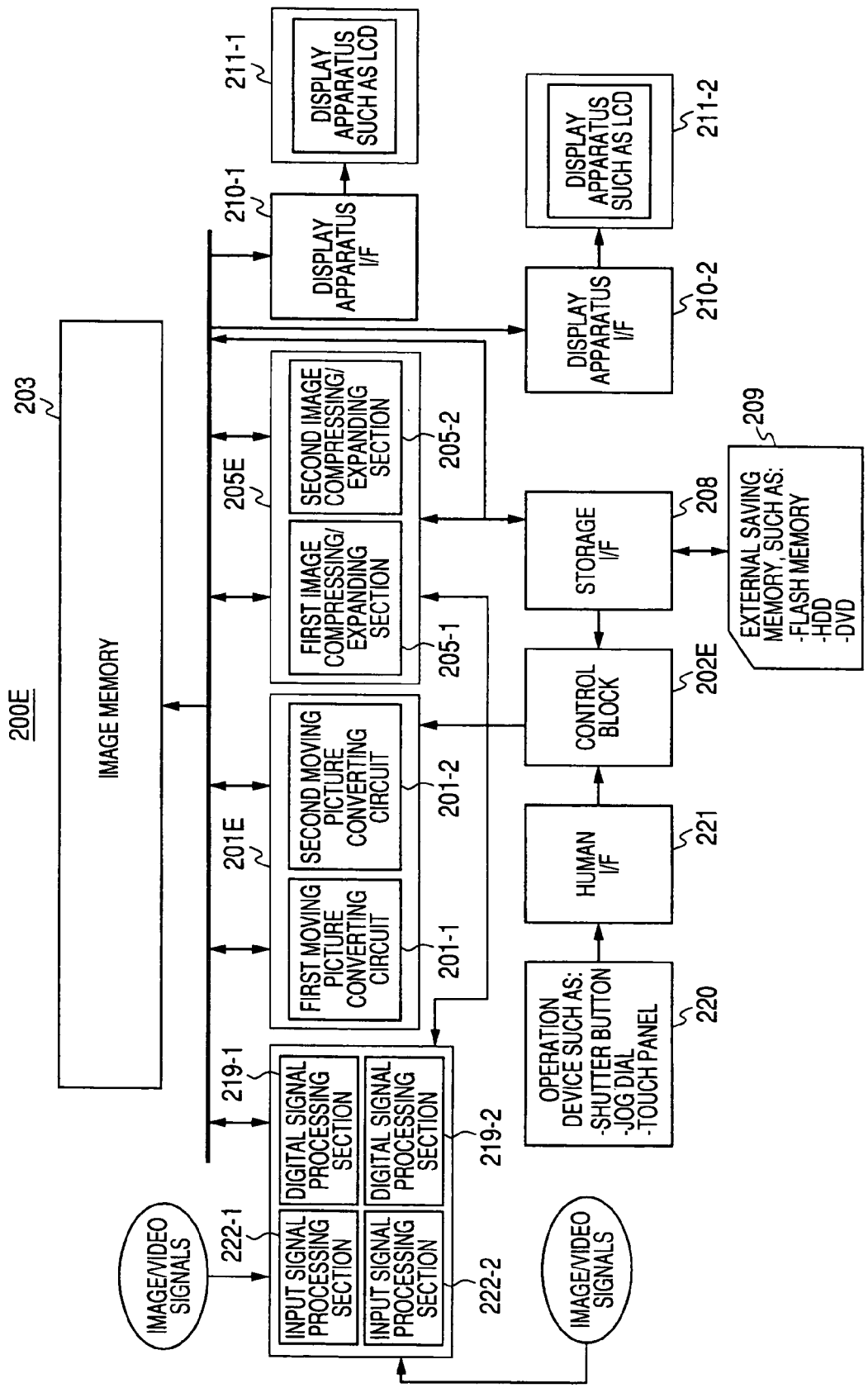
FIG. 14 is a block diagram showing a construction example of an image signal processing apparatus according to a seventh embodiment of the invention.

FIG. 14 is a block diagram showing a construction example of an image signal processing apparatus according to a seventh embodiment of the invention.

An image signal processing apparatus 200E according to the seventh embodiment is different from the image signal processing apparatus 200D of the sixth embodiment in that multiple (two in this embodiment) analog signal processing sections and digital signal processing sections are provided in the input section for image signals and that multiple (two in this embodiment) display interfaces are provided therein.

The image signal processing apparatus 200E of the seventh embodiment internally contains multiple display apparatus interfaces so that still and/or moving pictures can be displayed on multiple display apparatus 211-1 and 211-2.

Because of the multiple input signal processing sections, different moving pictures can be displayed on the display apparatus.

The functions according to the third embodiment allow the easy display of still and/or moving pictures even when different kinds of display apparatus connect thereto.

The use of the functions according to the sixth embodiment allows the simultaneous display of the original moving picture and multiple forms of the moving picture on other display apparatus. Furthermore, one moving picture can be displayed on display apparatus by changing one or some of the play starting point, resolution and frame rate.

Figure 15:
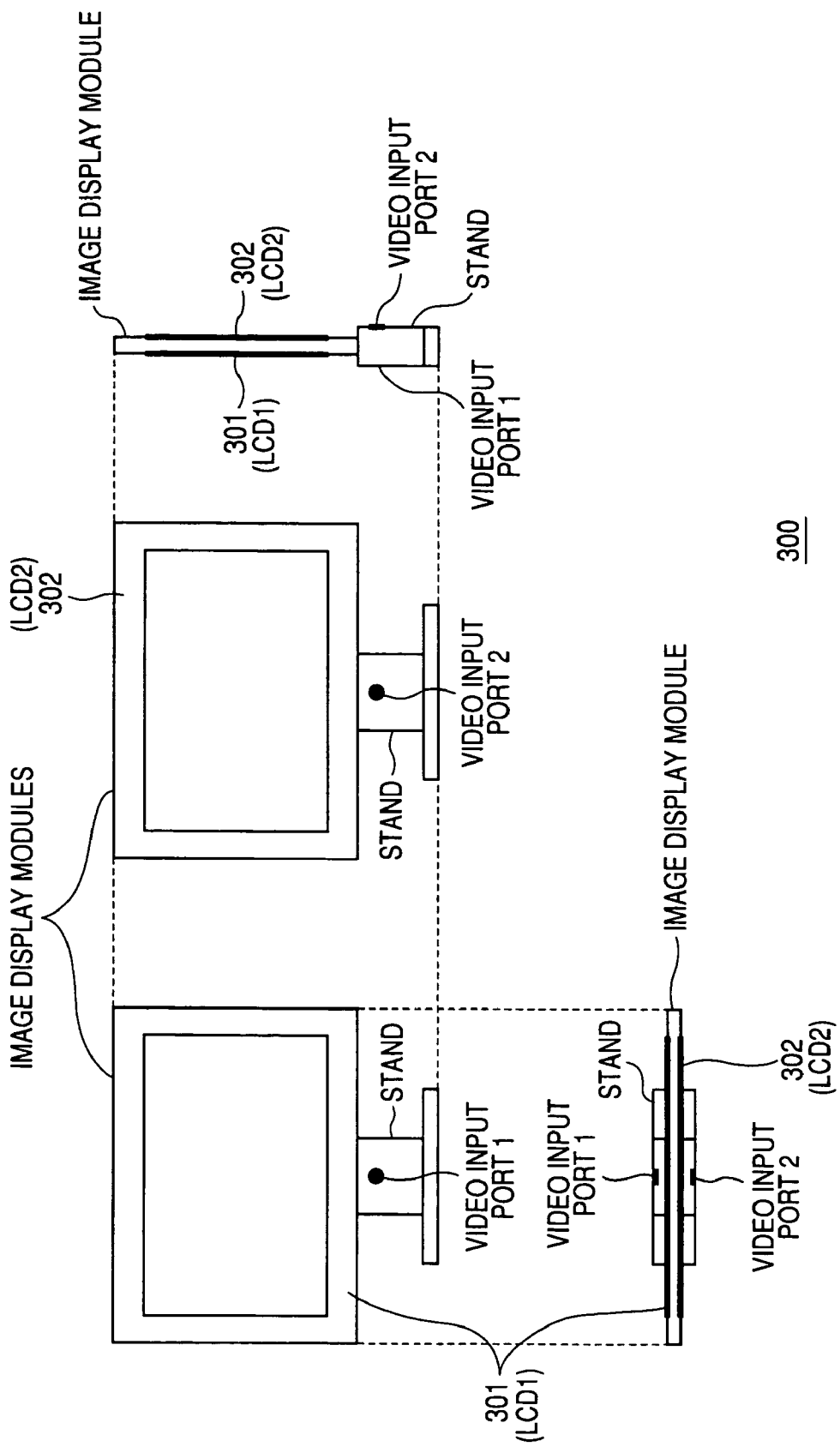
FIG. 15 is a diagram showing an example of the image display apparatus having the image signal processing apparatus (system) according to the seventh embodiment.

FIG. 15 is a diagram showing an example of an image display apparatus 300 applying the image signal processing apparatus (system) according to the seventh embodiment.

The image display apparatus 300 shown in FIG. 15 is a thin image display apparatus having two LCDs 301 and 302.

Image or video signals can be input from two video input ports. One moving picture may be displayed on the two LCDs, or different play forms of one moving picture or different kinds of moving picture may be displayed on the two LCDs.

The two LCDs may not have to be used all the time, and one LCD may be used only with the other powered down.

This one image display apparatus allows two users to simultaneously use for different purposes.

The first to seventh embodiments as described above provide following effects:

1. A still or moving picture with a higher resolution and a higher frame rate than before may be used;
2. A still or moving picture with a resolution and frame rate not compliant with a display apparatus may be created, shot or used;
3. An image display apparatus or camera apparatus with a small memory and low power consumption can be created;
4. The necessity for preparing a still or moving picture file for multiple kinds of display device may be eliminated;
5. The contents of a moving picture may be checked faster;
6. An optimum saving form of a moving picture may be selected more easily than before;
7. The capacity of the file for saving a still or moving picture may be reduced more than before;

8. The sizes of the circuit and/or apparatus for converting and/or displaying a moving picture with an unsteady resolution and frame rate may be reduced; and 9. One display apparatus may be used by multiple people.

Eighth Embodiment

Figure 16:
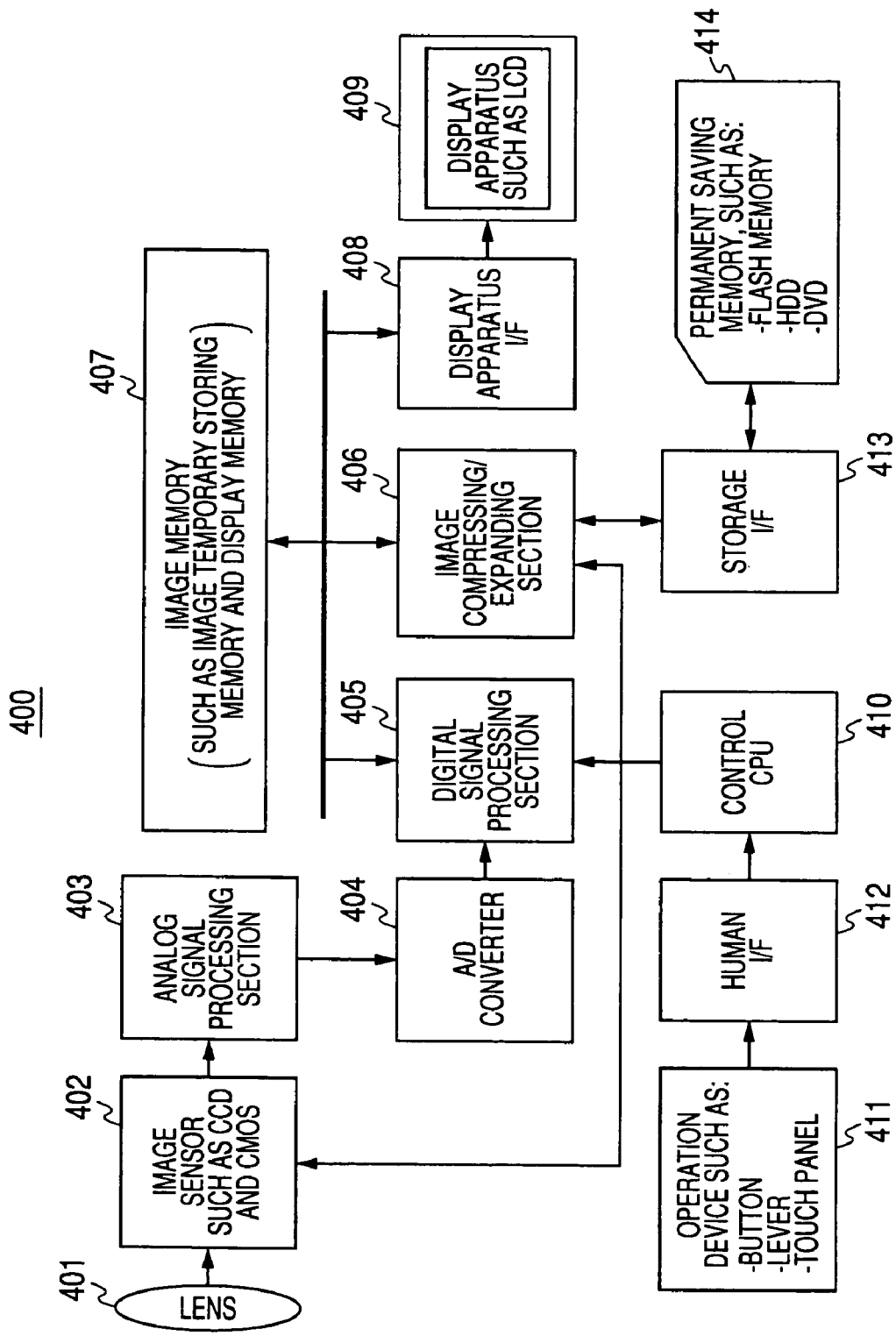
FIG. 16 is a block diagram showing a construction example of a camera system adopting a shot image recording apparatus according to an eighth embodiment of the invention.

FIG. 16 is a block diagram showing a construction example of a camera system adopting a shot image recording apparatus according to an eighth embodiment of the invention.

A camera system 400 includes an optical system 401, an image sensor (imaging apparatus) 402 having a CCD and a CMOS sensor, an analog signal processing section 403, an A/D converter 404, a digital signal processing section 405, an image compressing/expanding section 406, an image memory 407 functioning as an image temporary recording memory and a display memory, a display apparatus interface (I/F) 408, a display apparatus 409, a control CPU 410, an operation device 411, a human interface 412, a storage interface 413, and an external saving memory 414.

In the camera system 400, the digital signal processing section 405, image compressing/expanding section 406, image memory 407 and display apparatus interface 408 are connected via a bus 415.

The imaging section includes the optical system 401, the image sensor (imaging apparatus) 402 having a CCD and a CMOS sensor, and the analog signal processing section 403.

The optical system 401 mainly includes a lens and forms the image of a subject, not shown, on the photoreceptive plane of the image sensor 402 functioning as an imaging element.

The image sensor 402 photoelectronically transforms the information on the subject image formed through the optical system 401 and outputs the result to the analog signal processing section 403.

The analog signal processing section 403 performs Correlated Double Sampling (CDS) processing, analog amplification processing and so on on the analog output of the image sensor 402 and outputs the processed analog image data to the A/D converter 404.

The A/D converter 404 converts the analog image data by the analog signal processing section 403 to digital signals and outputs the digital signals to the digital signal processing section 405.

The digital signal processing section 405 may perform processing for determining the shutter speed for shooting before shooting, processing for adjusting the brightness and/or color of a shot image, and/or processing for compressing shot image data in accordance with a compressing scheme, which will be described in detail later, writing the result in the image memory 407, which is a recording medium, reading the written image data from the image memory 407 and expanding (or decompressing) the image data, for example.

The image compressing/expanding section 406 may have a decoder function of reading and expanding compressed data stored in the image memory 407 and an encoding function of creating an image source by performing signal compressing processing on multiple image data pieces such as signals from a camera.

The image compressing/expanding section 406 may save image data to the image saving memory 414 through the storage interface 413 or play image data from the memory 414.

The image saving memory 414 may be a flash memory, an HDD or a DVD, which is a non-volatile memory.

The display apparatus interface 408 outputs the image data to be displayed to the display apparatus 409 to display.

The display apparatus 409 may be a liquid crystal display apparatus (LCD).

The control CPU 410 controls the image sensor 402, digital signal processing section 405, image compressing/expanding section 406 and entire circuit.

The control CPU 410 performs control in accordance with an operation on the operation device 411 through the human interface 412.

The operation device 411 may include a shutter button, a jog dial and a touch panel, for example.

The camera system 400 according to the eighth embodiment inserts fast shot data into data shot at a normal speed and creates data having image data with a frame rate increased or decreased in a stepwise manner between the fast shot data and the data shot at the normal speed. All of the frames of the created image data may be played at a normal or other predetermined frame rate so that the display effect in which the display in slow motion fades in and out in time can be given to a viewer.

FIG. 17 is a diagram showing an image data construction, which may serially display a part shot at a normal frame rate, a part with a frame rate changing in a stepwise manner and a part shot at a predetermined high frame rate to provide the display effect (in which the display in slow motion fades in and out in time).

In FIG. 17, each of the hatched frames is a frame to be adopted for saving.

In this example, display at a normal frame rate is performed from the beginning of shooting to fast shooting. When the display of the play reaches to the fast shooting point in time, the visual speed of play decreases gradually.

Then, the speed of play visually reaches to a predetermined slow-motion play part, and the display at the state is kept for a while. Then, the speed of play is gradually increased from the visual slow motion to the normal speed and finally returns to the normal speed of play.

The camera system 400 in FIG. 16 adopts the shot image recording apparatus that creates such image data.

As described above, the digital camera system 400 according to the eighth embodiment has the image sensor 402 which may perform shooting, that is, image-capturing at a higher frame rate than the order of 60 fps providing the sufficient display effect to the visual sense of human beings.

The image sensor 402 is followed by the analog processing section 403 for gain control, the A/D converting section 404 and the digital signal processing section 405, which may sequentially process image data fed from the sensor side at a high speed.

Here, the signal-processed data is transferred to the image memory 407 or external saving recording apparatus 414 functioning as a temporary image recording section and may also be transferred to a display memory as required to display on the display apparatus 409 such as an LCD and a TV.

The control CPU 410 includes a control section mainly having a microcomputer, and the control section receives an instruction from a user through a button input operation and reflects the instruction to the signal processing section or other sections.

In response to an instruction for fast shooting from a user through an input device such as a button, the image sensor 402 performs shooting at a greatly high frame rate such as 240 fps, starting feeding many, such as 240, pieces of image data in one second to the subsequent components as a result.

The subsequent signal processing section has already recognized the fast shooting instruction from a user, and increases the processing speed and ability for allowing the processing for a high frame rate before accepting image data from the sensor side.

Here, image data with a fade-in/out effect or other display effects may be created by thinning out processed frames and selecting frames to be recorded and displayed properly, not by processing, recording and displaying all fed frames.

Figure 18:
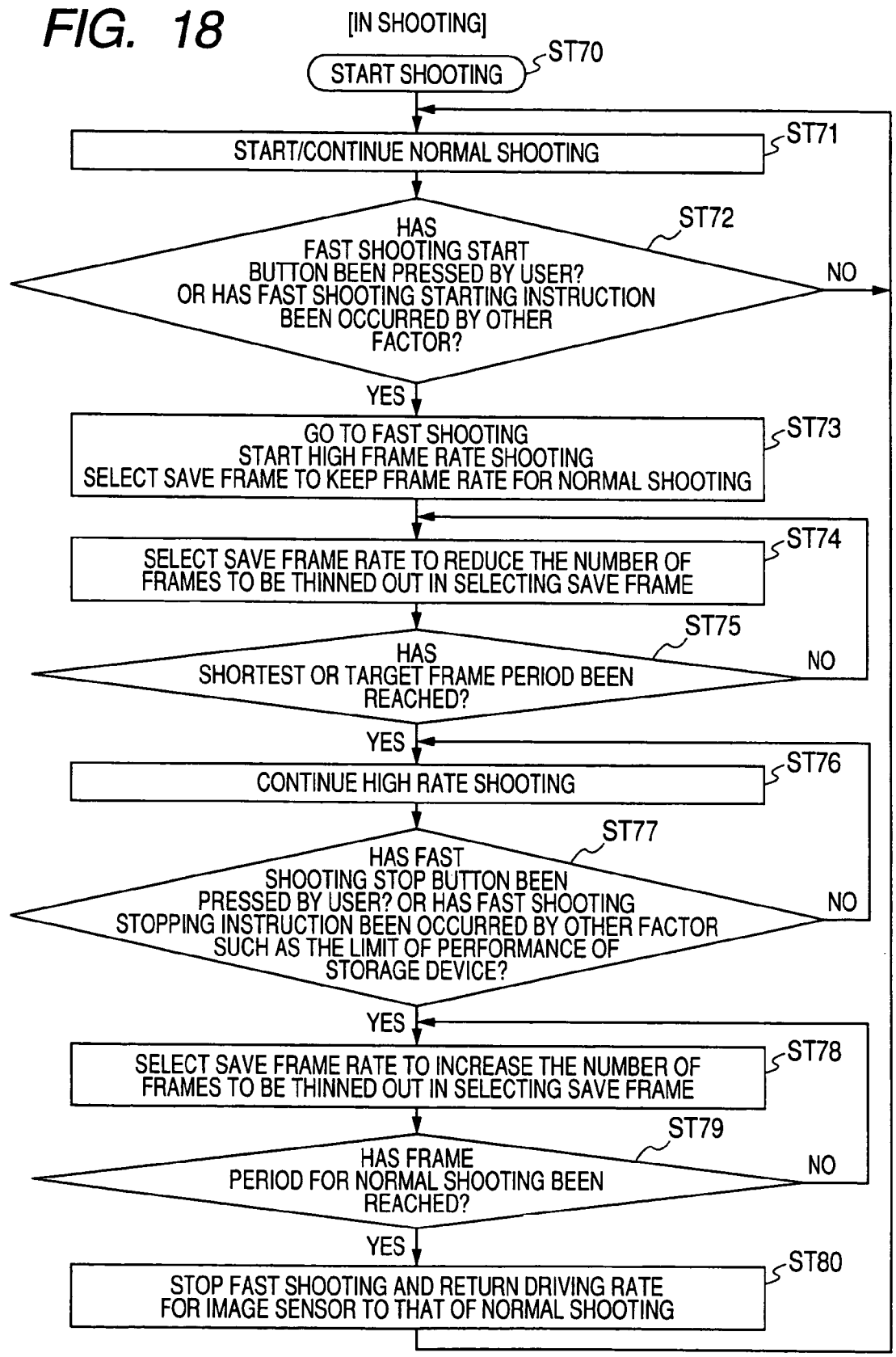
FIG. 18 is a flowchart showing an operation example in shooting by the camera system according to the eighth embodiment.
Figure 19:
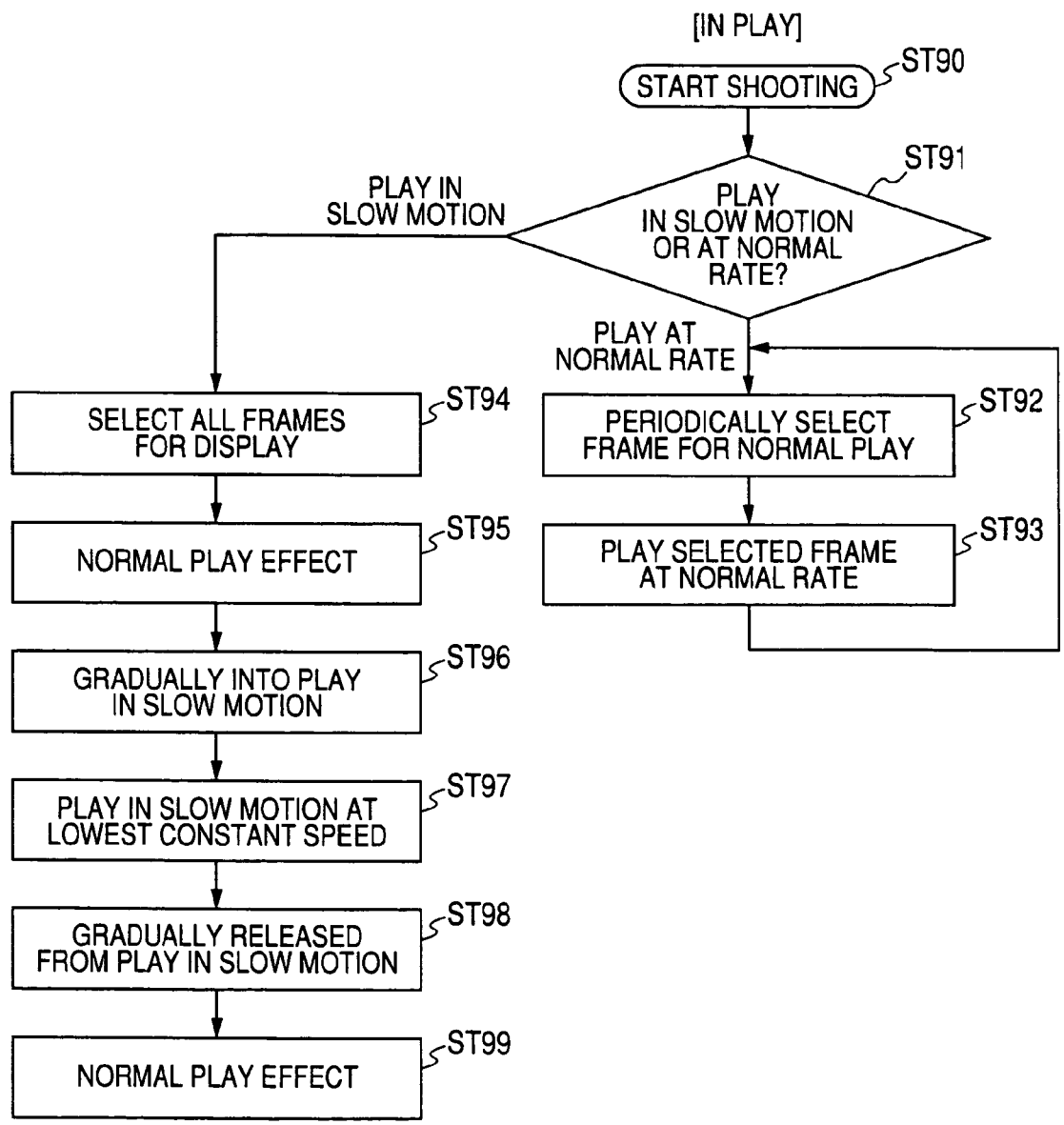
FIG. 19 is a flowchart showing an operation example in play by the camera system according to the eighth embodiment.

FIG. 18 is a flowchart showing an operation example in shooting by the camera system according to the eighth embodiment. FIG. 19 is a flowchart showing an operation example in play by the camera system according to the eighth embodiment.

The shooting is performed by the processing from steps ST70 to ST80 shown in FIG. 18 as described below.

The play is performed by the processing from steps ST90 to ST99 shown in FIG. 19 as described below.

The apparatus normally shoots a moving picture at a speed of 30 fps, for example, in response to a shooting instruction from a user.

When the apparatus receives a command for an operation at a high frame rate based on a user's instruction through an input device or an instruction due to other factors such as a timer setting and a characteristic amount of an image (such as the brightness of the screen and a difference from the entire screen) through the control CPU 410, the apparatus instructs the image sensor 402 to shoot at a high frame rate.

The images shot at a high frame rate by the image sensor 402 are fed to the digital signal processing section 405 through the A/D converter 404 one by one at intervals of $1/240$ sec., for example.

In the beginning, one image is processed in $1/60$ sec. and is saved in a temporary storage area, without processing all of the fed frames from the beginning. After the processing is repeated on several images, the thin-out rate for frames to be processed is changed, and one image is selected, processed and saved in $1/90$ sec.

The change of the thin-out rate is serially repeated, and, after the thin-out rates of one image in $1/120$ sec. and one image in $1/180$ sec., images are finally processed and saved with no thin-out processing thereon or a lowest thin-out rate.

Shooting is continued for a predetermined period of time with no thin-out processing thereon or a lowest thin-out rate. The shooting is continued until the apparatus receives a command for stopping the high-frame-rate shooting from a user or based on other factors or when the capacity and/or transfer rate of the temporary storage area 407 or the memory 414, which is a permanent storage device, reach/reaches the limit or limits.

When the capacity and/or transfer rate of the storage section reach/reaches the limit or limits, a signal indicating the limit of the ability of the storage section is transmitted from the storage section control section to the CPU, which is equal to the command for stopping the high-frame-rate shooting by a user, for example.

When the CPU 410 recognizes the command for stopping the high-frame-rate shooting, the thin-out rate for frames to be saved is gradually increased, which is the reverse processing of that in the beginning of the high-frame-rate shooting.

For example, the save rate of one in $1/240$ sec. may be changed to $1/180$, $1/120$, $1/90$ and so on, and the number of frames to be thinned out without saving is gradually increased. Finally, the frame rate returns to the frame rate before the high-frame-rate shooting mode. At the same time, the shooting operation by the sensor is also returned to the operation of shooting and sending images at the normal frame rate.

Notably, image data at various frame intervals may be created by changing the shooting rate by the sensor arbitrarily instead of changing the frame rate for shooting and saving by the signal processing section as described above.

However, in this case, the sequential change of the shooting rate by the sensor may not keep the uniform quality of all frames on the image sensor 402 side.

There may be a shooting frame rate that the image sensor 402 itself may handle more easily than others, and it may be difficult to control the amount of light exposure and/or surroundings of the shutter.

In addition, the images with frame rates changed variously by the previous image sensor 402 may be required to handle by the subsequent signal processing side in accordance with the various frame rates, which generally makes the design of a control scheme for synchronizing the operation speeds between the image sensor 402 and the signal processing side difficult, though not impossible.

In the method for playing image data created by thinning out frames in a stepwise manner, the temporarily or permanently recorded data is read out to the display memory after the end of a series of shooting steps.

The time interval between the read frames varies for the reasons above. However, the frames may be transmitted to a display apparatus by considering that the frames have the same time intervals and the frame rate for normal shooting (such as 30 fps). The display apparatus displays each image in $1/30$ sec., for example, on a panel thereof.

In the play, the normally shot frames are played normally, and the frames shot actually at a high frame rate such as at intervals of $1/60$ sec. are displayed at intervals of $1/30$ sec, resulting in a visual display effect in slow motion.

After that, frames at intervals of $1/120$ and $1/180$ sec. are sequentially played at intervals of 30 fps, and the play speed is gradually and visually decreased, resulting in a display effect gradually strengthening the slow-motion effect, that is, fading in the slow motion effect.

Then, after the shot part at intervals of $1/240$ sec. is played at a uniformly low play speed, the slow motion speed appears to, conversely this time, gradually increase to the normal play speed, and the display returns to the normal play mode.

In order to play all of the recorded image data normally without the slow-motion effect, frames at intervals of $1/30$ sec. in the high-frame-rate shot part may be only selected and transmitted to a display apparatus.

In this manner, the fade-in-and-fade-out effect in the slow-motion play may be provided by one video camera or digital camera apparatus.

Besides the recording method as described above, the data already shot at a high frame rate may be finally converted by software in a computer to image data having various rate intervals as described above and playable with the fade-in/fade-out effect.

In this case, the frame shot at the highest rate such as 240 fps may be saved or played by sequentially changing the thin-out rates as performed in the camera system 400.

Images may be saved at arbitrary rates, except for a predetermined pattern as described above, that is, a predetermined fade-in/fade-out effect in the described case. In this case, the play effect can be provided in accordance with the arbitrary pattern. The shooting rate for shooting may be selected in a stepwise manner through an input device to be operated by a user. For example, the shooting rate may be changed based on the degree of the push of a button, or the shooting rate may be changed based on the degree of the bend of a lever of an input lever device.

According to the eighth embodiment, a viewer can be provided with the image display having the display effect in which the speed of display gradually decreases from the normal speed to a slow-motion speed and then, through the display in complete slow motion for a while, gradually increases to the normal speed.

Furthermore, a viewer can be provided with the image display having the display effect in which the speed of display gradually increases from the normal speed to the still state finally through a slow-motion speed.

Furthermore, a viewer can be provided with the image display having the display effect in which the slow-motion display in the beginning gradually returns to the normal speed.

Furthermore, these display effects can be realized by a single digital camera system, without the necessity for a separate special image display apparatus. Thus, the display effect can be viewed immediately after shooting.

A system having a shooting element at a predetermined shooting rate may be used to create image data with these display effects, without the necessity for a special function in the shooting element.

The image data already shot may be processed to create image data having these display effects.

Ninth Embodiment

FIG. 20 is a block diagram showing a construction example of a camera system according to a ninth embodiment of the invention.

A camera system 500 includes an image sensor (solid-state imaging element) 501 having a CCD and a CMOS sensor, a CPU 502 functioning as a control section, a memory 503, a time zoom button (switch) 504, a signal processing section 505, a decoder section (CODEC) 506 and a timing generator (TG) 507.

The camera system 500 of the ninth embodiment allows the change of the frame rate by user's decision during an operation of shooting a moving picture and has a function of suppressing the amount of image data therewith.

According to the ninth embodiment, the time zoom button 504 is provided which can be operated by a user arbitrarily, and the frame rate may be changed in accordance with the amount of pushing (or amount of operating) the time zoom button 504.

The term, "time zoom", refers to the change of the frame rate, and the switch providing the function is called time zoom button, hereinafter.

The image sensor (solid-state imaging element) 501 photoelectronically transforms light-gathered image and outputs video signals in accordance with the amount of received light.

The CPU 502 outputs a frame rate control signal FCTL to the timing generator 507 with reference to the frame rate change from the time zoom button 504.

The memory 503 is a temporary saving area for image data converted to a predetermined format by the signal processing section 505.

The signal processing section 505 converts image data to a predetermined format and saves the converted image data in the memory 503. The image format may be a brightness/color-difference form defined by ITU-R BT601 or ITU-R BT709.

The decoder section (CODEC) 506 compresses signals in a predetermined image format and creates a compressed image format such as JPEG and MPEG.

The timing generator (TG) 507 outputs a drive signal DRV for driving the image sensor (solid-state imaging element) 501.

Figure 21C:
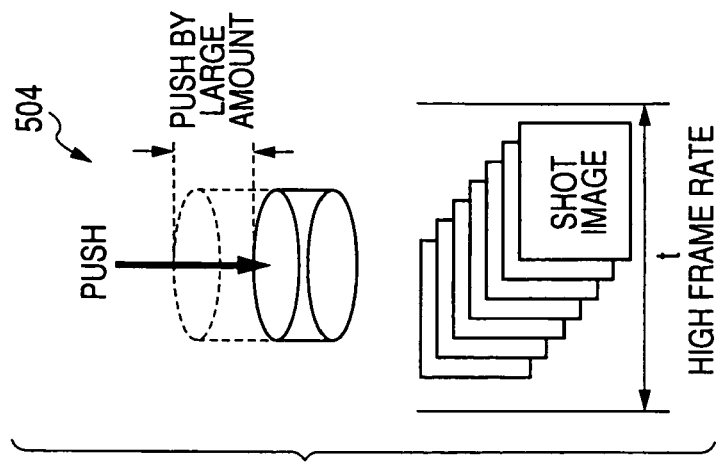
FIGS. 21A to 21C are diagrams showing a frame rate changing method by using vertical and/or horizontal synchronizing signals according to the ninth embodiment.
Figure 21B:
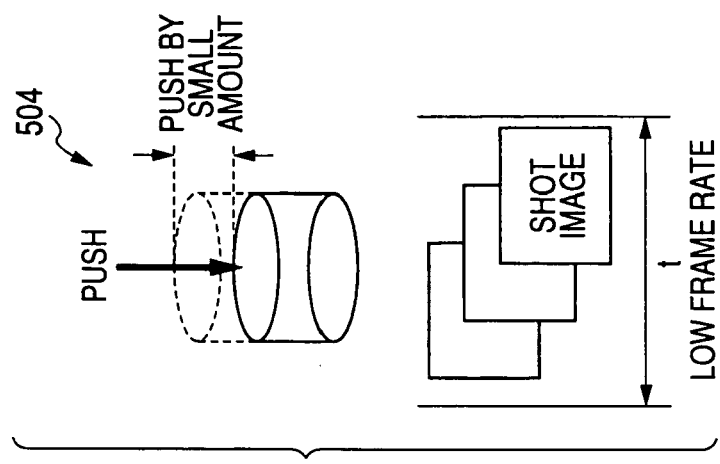
Figure 21A:
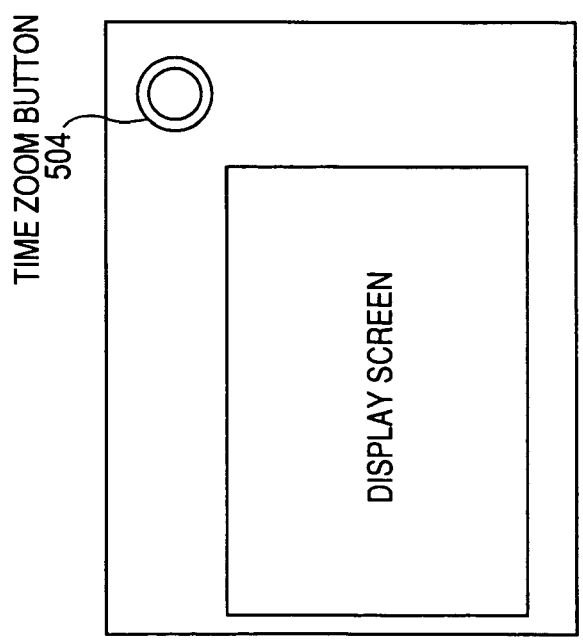

FIGS. 21A to 21C are diagrams showing a method for changing the frame rate by using vertical/horizontal synchronizing signals according to the ninth embodiment.

The time zoom button 504 according to this embodiment may be a push-type switch.

The frame rate may be changed by pushing the time zoom button 504 during an operation of shooting a moving picture.

The frame rate depends on the depth of push of the time zoom button 504 and is controlled to change in a stepwise or continuous manner.

A method for controlling the image sensor (solid-state imaging element) that implements the dynamic change of the frame rate according to the ninth embodiment of the invention will be described below.

The frame rate changing method may include three methods of:

1. Frame rate changing method by using vertical/horizontal synchronizing signals;
2. Frame rate changing method by selecting a frame to be processed from a memory, which is a temporary saving area for image data; and
3. Frame rate changing method by dynamically controlling the drive clock of the solid-state imaging element.

Frame Rate Changing Method by Using Vertical/Horizontal Synchronizing Signals

Figure 22:
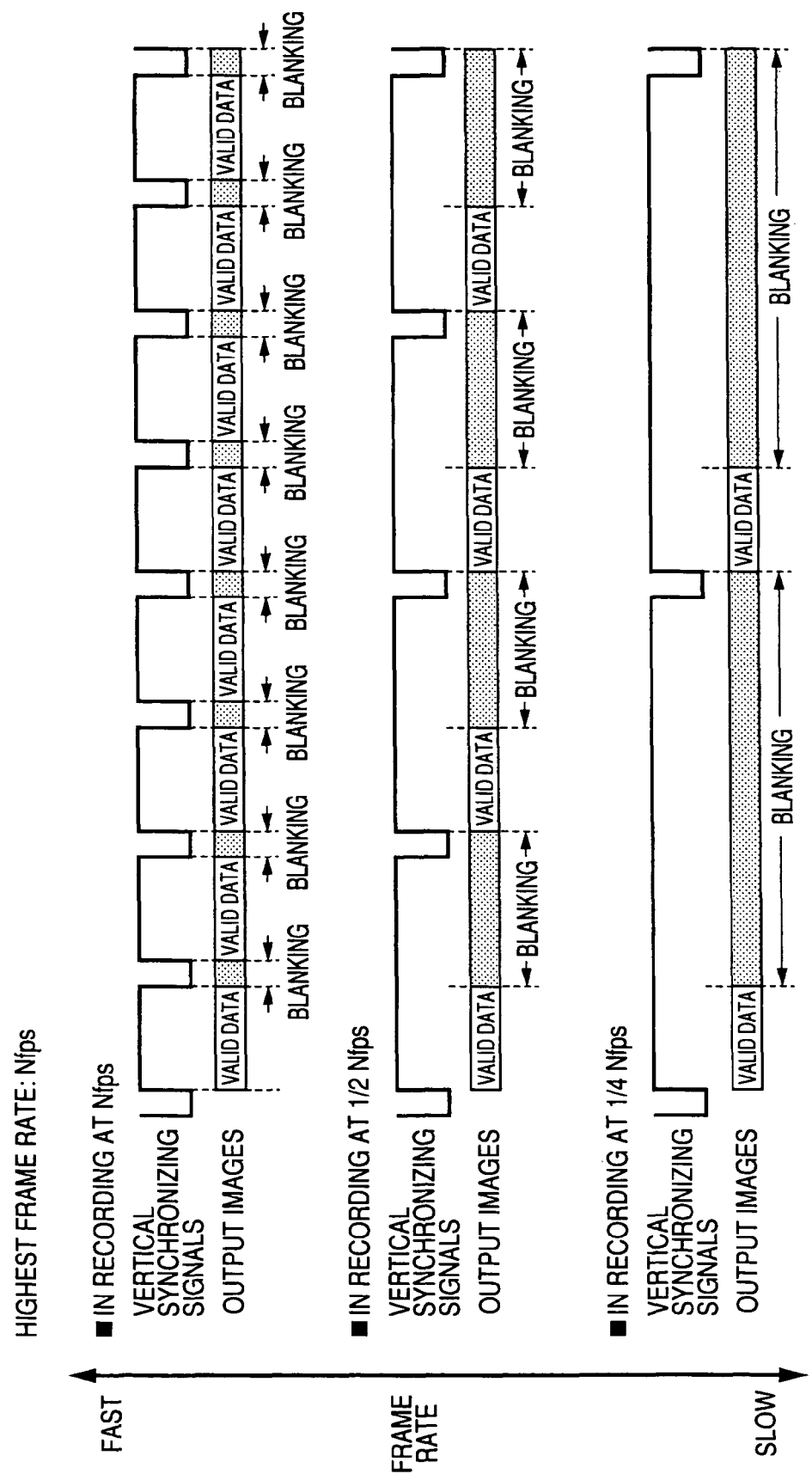
FIG. 22 is a diagram showing the frame rate changing method by using vertical and/or horizontal synchronizing signals according to the ninth embodiment.

FIG. 22 is a diagram describing the frame rate changing method by using vertical/horizontal synchronizing signals according to the ninth embodiment.

It is assumed here that the solid-state imaging element is operating at the highest driving frequency during the implementation of the frame rate changing method.

It is further assumed here that the highest frame rate of the image sensor (solid-state imaging element) 501 is Nfps and that a moving picture is recorded at a frame rate of ¼N fps before the time zoom button 504 is pushed.

Here, a vertical synchronizing signal for controlling the switching between frames is output from the timing generator (TG) 507 every 1/(¼N) sec.

Then, since the image sensor (solid-state imaging element) 501 is operating at the highest driving frequency, the significant output of the image sensor (solid-state imaging element) 501 is output at the same time as that of the case where the image sensor (solid-state imaging element) 501 is operating at the highest frame rate, and the rests are blanking periods.

Next, if the time zoom button 504 is pushed at an arbitrary time to set ½ Nfps, the vertical synchronizing signal is output from the timing generator (TG) 507 every 1/(½N) sec.

Here, the significant output of the image sensor (solid-state imaging element) 501 is output at the same time as that of the case where the image sensor (solid-state imaging element) 501 is operating at the highest frame rate, and the rests are blanking periods.

Subsequently, if the time zoom button 504 is pushed at an arbitrary time to set the highest frame rate, the vertical synchronizing signal is output from the timing generator (TG) 507 every 1/N sec. Here, the blanking period is a necessary minimum period.

Instead of the use of the vertical synchronizing signal, the same effect can be provided by using a horizontal synchronizing signal or both vertical and horizontal synchronizing signals as the control signal for frame-rate changing.

As described above, a moving picture can be shot at an arbitrary frame rate by controlling the vertical/horizontal synchronizing signals only, without changing the driving frequency for the image sensor (solid-state imaging element).

Frame Rate Changing Method by Selecting a Frame to be Processed

Figure 23:
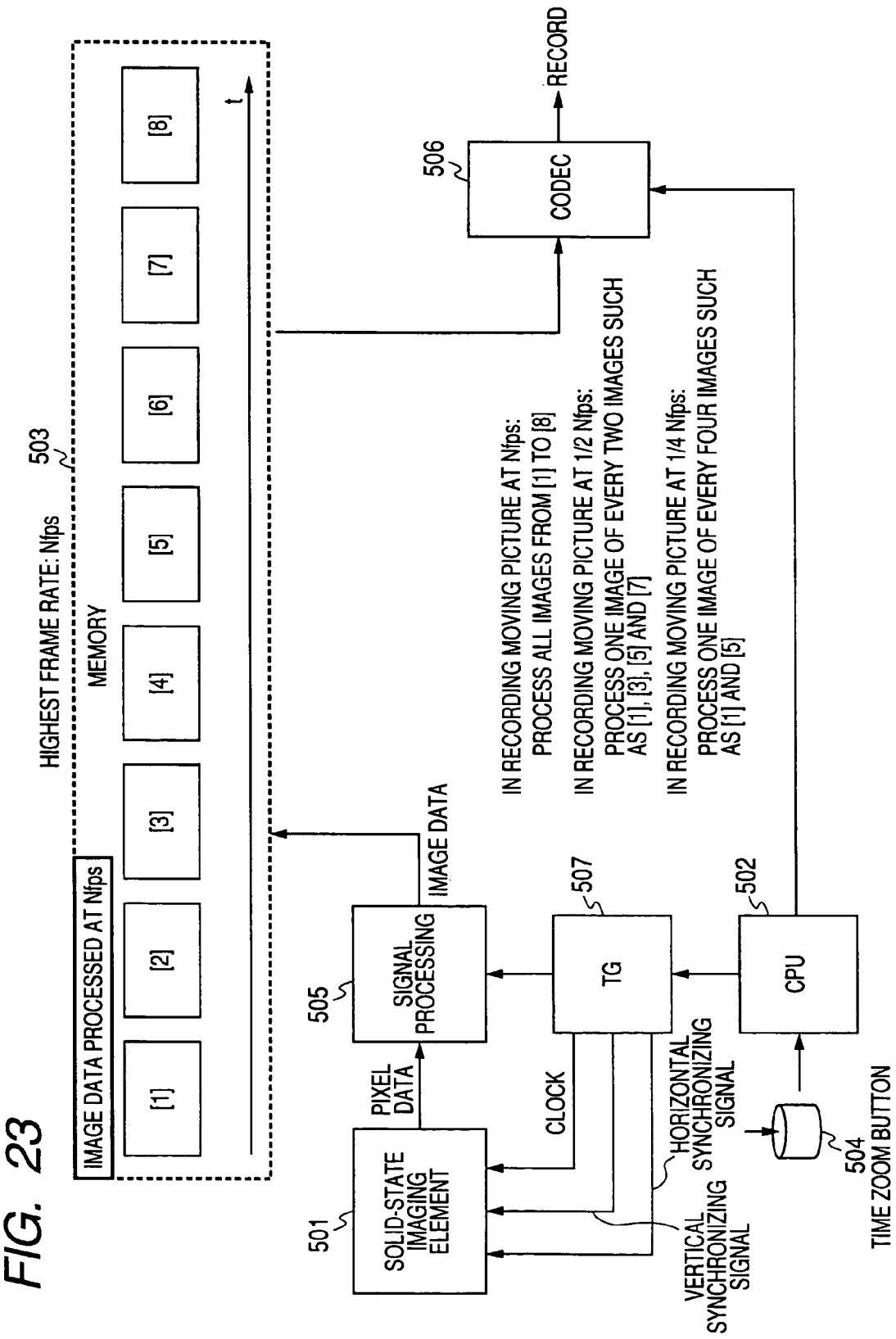
FIG. 23 is a diagram showing a frame rate changing method based on the selection of frames to be used without changing the clock of an image sensor (solid imaging element) according to the ninth embodiment.

FIG. 23 is a diagram showing a frame rate changing method by selecting a frame to be used, without changing the clock of the image sensor (solid-state imaging element) according to the ninth embodiment.

It is assumed that the image sensor (solid-state imaging element) 501 is operating at the highest driving frequency during the implementation of the frame rate changing method.

It is further assumed that the highest frame rate of the image sensor (solid-state imaging element) 501 is Nfps and that a moving picture is recorded at a frame rate of ¼ Nfps before the time zoom button 504 is pushed.

Here, the image sensor (solid-state imaging element) 501 outputs pixel data at Nfps, and the signal processing section 505 saves image data in the memory 503 at Nfps.

The decoder section (CODEC) 506 processes and records one image data piece out of four image data pieces in the image data saved in the memory 503 so as to satisfy a frame rate of ¼ Nfps.

Next, a case where a moving picture is recorded at a frame rate of ½ Nfps set by pushing the time zoom button 504 at an arbitrary time will be considered.

Here, the image sensor (solid-state imaging element) 501 outputs pixel data at Nfps, and the signal processing section 505 saves image data in the memory 503 at Nfps.

The decoder section (CODEC) 506 processes and records one image data piece out of two image data pieces in the image data saved in the memory 503 so as to satisfy a frame rate of ½ Nfps.

If the time zoom button 504 is pushed at an arbitrary time and the highest frame rate is set for recording a moving picture, the image sensor (solid-state imaging element) 501 here outputs image data at Nfps, and the signal processing section 505 saves image data in the memory 503 at Nfps.

The decoder section (CODEC) 506 processes and records all image data pieces in the image data saved in the memory 503 so as to satisfy a frame rate of Nfps.

As described above, a moving picture can be shot at an arbitrary frame rate by selecting an image to be compressed by the decoder section (CODEC), without changing the control over the solid-state imaging element and signal processing.

Figure 24:
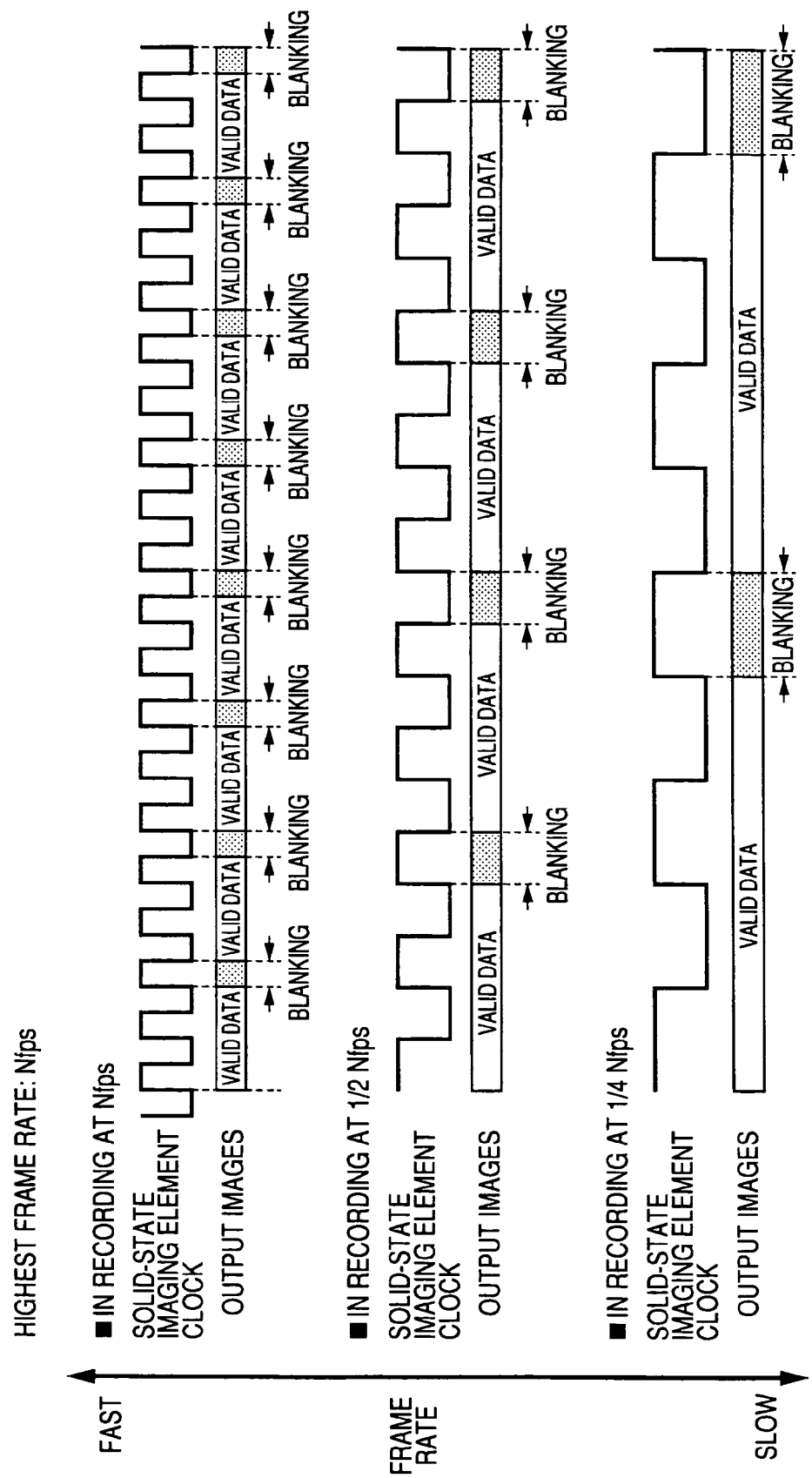
FIG. 24 is a diagram showing a frame rate changing method by dynamically controlling the clock of the image sensor (solid imaging element) according to the ninth embodiment.

Frame Rate Changing Method by Dynamically Controlling the Drive Clock of the Solid-State Imaging Element FIG. 24 is a diagram showing a frame rate changing method by dynamically controlling the clock of the image sensor (solid-state imaging element) according to the ninth embodiment.

It is assumed that the highest frame rate of the image sensor (solid-state imaging element) 501 is Nfps and that a moving picture is recorded at a frame rate of ¼ Nfps before the time zoom button 504 is pushed.

Here, the timing generator (TG) 507 outputs the clock equal to ¼ of the highest operating frequency of the image sensor (solid-state imaging element) 501 to the image sensor (solid-state imaging element) 501.

The image sensor (solid-state imaging element) 501 outputs pixel data at ¼ Nfps, and the signal processing section 505 processes the pixel data and saves the image data in the memory 503 at ¼ Nfps.

The decoder section (CODEC) 506 processes and records image data saved in the memory 503 at ¼ Nfps.

Next, a case where a moving picture is recorded at a frame rate of ½ Nfps set by pushing the time zoom button 504 at an arbitrary time will be considered.

Here, the timing generator (TG) 507 outputs the clock equal to ½ of the highest operating frequency of the image sensor (solid-state imaging element) 501 to the image sensor (solid-state imaging element) 501.

The image sensor (solid-state imaging element) 501 outputs pixel data at ½ Nfps, and the signal processing section 505 processes the pixel data and saves image data in the memory 503 at ½ Nfps.

The decoder section (CODEC) 506 processes and records image data saved in the memory 503 at ½ Nfps.

Next, a case where a moving picture is recorded at a highest frame rate set by pushing the time zoom button 504 at an arbitrary time will be considered.

Here, the timing generator (TG) 507 outputs the highest operating frequency of the image sensor (solid-state imaging element) 501 to the image sensor (solid-state imaging element) 501.

The image sensor (solid-state imaging element) 501 outputs pixel data at Nfps, and the signal processing section 505 processes the pixel data and saves image data in the memory 503 at Nfps.

The decoder section (CODEC) 506 processes and records image data saved in the memory 503 at Nfps.

According to the ninth embodiment, the frame rate can be changed dynamically, which uniquely allows the shooting of a necessary scene only at a high frame rate.

Since this allows the dynamic selection of a scene to be shot at a high frame rate, the size of the image data can be more significantly suppressed than the one shot at a fixed high frame rate.

It should be understood by those skilled in the art that various modifications, combinations, sub-combinations and alterations may occur depending on design requirements and other factors insofar as they are within the scope of the appended claims or the equivalents thereof.

What is claimed is:

1. An image converting apparatus comprising:
a memory which can store frame information of an image to be played;
an image processing section which can read frame information from the memory and convert the frame rate to a predetermined frame rate in response to a predetermined state and in accordance with the play state; and
a processing engine having a calculation function for increasing or reducing the size of an image to an arbitrary size and creating a new pixel from multiple original images stored in the memory,
wherein the image processing section creates a new frame based on the processing result by the processing engine and changes the frame rate of images within a predetermined period of time,
wherein the processing engine calculates a new motion vector from motion vector information stored in the memory; and
the image processing section creates a new frame based on the new motion vector.

* * * * *